(12) United States Patent
King et al.

(10) Patent No.: US 10,223,701 B2
(45) Date of Patent: Mar. 5, 2019

(54) SYSTEM AND METHOD FOR VERIFIED MONETIZATION OF COMMERCIAL CAMPAIGNS

(75) Inventors: Simon P King, Berkeley, CA (US); Marc Eliot Davis, San Francisco, CA (US); Christopher William Higgins, Portland, OR (US)

(73) Assignee: EXCALIBUR IP, LLC, New York, NY (US)

( * ) Notice: Subject to any disclaimer, the term of this patent is extended or adjusted under 35 U.S.C. 154(b) by 1660 days.

(21) Appl. No.: 12/536,892

(22) Filed: Aug. 6, 2009

(65) Prior Publication Data

US 2011/0035265 A1 Feb. 10, 2011

(51) Int. Cl.
*G06Q 30/02* (2012.01)

(52) U.S. Cl.
CPC ......... *G06Q 30/02* (2013.01); *G06Q 30/0211* (2013.01); *G06Q 30/0246* (2013.01); *G06Q 30/0273* (2013.01)

(58) Field of Classification Search
CPC ...................................................... G06G 30/02
USPC ...................................................... 705/14.27
See application file for complete search history.

(56) References Cited

U.S. PATENT DOCUMENTS

| | | |
|---|---|---|
| 5,446,891 A | 8/1995 | Kaplan et al. |
| 5,493,692 A | 2/1996 | Theimer et al. |
| 5,583,763 A | 12/1996 | Atcheson et al. |
| 5,651,068 A | 7/1997 | Klemba et al. |
| 5,761,662 A | 6/1998 | Dasan |
| 5,764,906 A | 6/1998 | Edelstein et al. |
| 5,781,879 A | 7/1998 | Arnold et al. |
| 5,784,365 A | 7/1998 | Ikeda |
| 5,794,210 A | 8/1998 | Goldhaber et al. |

(Continued)

FOREIGN PATENT DOCUMENTS

| | | |
|---|---|---|
| EP | 1362302 | 11/2003 |
| JP | 2002312559 | 10/2002 |

(Continued)

OTHER PUBLICATIONS

U.S. Appl. No. 11/617,451, filed Dec. 28, 2006, Kalaboukis.

(Continued)

*Primary Examiner* — Daniel M Sorkowitz
(74) *Attorney, Agent, or Firm* — James J. DeCarlo; Greenberg Traurig, LLP

(57) ABSTRACT

A system and method for verified monetization. A definition of a commercial campaign is received wherein the definition comprises an identification of an advertiser and an advertisement, at least one trigger condition, at least one monetization condition, at least one verification policy, and at least one monetization action, wherein trigger conditions relate to the occurrence of trigger events, the monetization conditions relate to location data relating to at least one person, verification policies relates to the reliability of the location data, and the monetization actions relates to payments to payees. When an indication of an association between a user and the advertisement is received, the user is associated with the commercial campaign. When the occurrence of trigger events is detected, if the campaigns monetization conditions and verification policies have been satisfied, payees are paid according to the campaign's monetization actions.

17 Claims, 5 Drawing Sheets

(56) References Cited

U.S. PATENT DOCUMENTS

| | | | |
|---|---|---|---|
| 5,802,510 | A | 9/1998 | Jones |
| 5,835,087 | A | 11/1998 | Herz |
| 5,855,008 | A * | 12/1998 | Goldhaber et al. .......... 705/14.1 |
| 5,903,848 | A | 5/1999 | Takahashi |
| 5,920,854 | A | 7/1999 | Kirsch et al. |
| 6,021,403 | A | 2/2000 | Horvitz et al. |
| 6,047,234 | A | 4/2000 | Cherveny et al. |
| 6,098,065 | A | 8/2000 | Skillen et al. |
| 6,112,181 | A | 8/2000 | Shear et al. |
| 6,014,638 | A | 11/2000 | Burge et al. |
| 6,157,924 | A | 12/2000 | Austin |
| 6,169,992 | B1 | 1/2001 | Beall et al. |
| 6,212,552 | B1 | 4/2001 | Biliris et al. |
| 6,266,667 | B1 | 7/2001 | Olsson |
| 6,314,365 | B1 | 11/2001 | Smith |
| 6,314,399 | B1 | 11/2001 | Deligne et al. |
| 6,324,519 | B1 | 11/2001 | Eldering |
| 6,327,590 | B1 | 12/2001 | Chidlovskii et al. |
| 6,446,065 | B1 | 9/2002 | Nishioka et al. |
| 6,490,698 | B1 | 12/2002 | Horvitz et al. |
| 6,502,033 | B1 | 12/2002 | Phuyal |
| 6,523,172 | B1 | 2/2003 | Martinez-Guerra et al. |
| 6,571,279 | B1 | 5/2003 | Herz et al. |
| 6,601,012 | B1 | 7/2003 | Horvitz et al. |
| 6,662,195 | B1 | 12/2003 | Langseth et al. |
| 6,665,640 | B1 | 12/2003 | Bennett et al. |
| 6,694,316 | B1 | 2/2004 | Langseth et al. |
| 6,701,311 | B2 | 3/2004 | Biebesheimer et al. |
| 6,701,315 | B1 | 3/2004 | Austin |
| 6,708,203 | B1 | 3/2004 | Maker et al. |
| 6,731,940 | B1 | 5/2004 | Nagendran |
| 6,741,980 | B1 | 5/2004 | Langseth et al. |
| 6,757,661 | B1 | 6/2004 | Blaser et al. |
| 6,773,344 | B1 | 8/2004 | Gabai et al. |
| 6,781,920 | B2 | 8/2004 | Bates et al. |
| 6,785,670 | B1 | 8/2004 | Chiang et al. |
| 6,789,073 | B1 | 9/2004 | Lunenfeld |
| 6,813,501 | B2 | 11/2004 | Kinnunen et al. |
| 6,816,850 | B2 | 11/2004 | Culliss |
| 6,829,333 | B1 | 12/2004 | Frazier |
| 6,834,195 | B2 | 12/2004 | Brandenberg et al. |
| 6,842,761 | B2 | 1/2005 | Diamond et al. |
| 6,845,370 | B2 | 1/2005 | Burkey et al. |
| 6,850,252 | B1 | 2/2005 | Hoffberg |
| 6,853,913 | B2 | 2/2005 | Cherveny et al. |
| 6,853,982 | B2 | 2/2005 | Smith et al. |
| 6,882,977 | B1 | 4/2005 | Miller |
| 6,904,160 | B2 | 6/2005 | Burgess |
| 6,931,254 | B1 | 8/2005 | Egner et al. |
| 6,961,660 | B2 | 11/2005 | Underbrink et al. |
| 6,961,731 | B2 | 11/2005 | Holbrook |
| 6,985,839 | B1 | 1/2006 | Motamedi et al. |
| 7,010,492 | B1 | 3/2006 | Bassett et al. |
| 7,027,801 | B1 | 4/2006 | Hall et al. |
| 7,058,508 | B2 | 6/2006 | Combs et al. |
| 7,058,626 | B1 | 6/2006 | Pan et al. |
| 7,062,510 | B1 | 6/2006 | Eldering |
| 7,065,345 | B2 | 6/2006 | Carlton et al. |
| 7,065,483 | B2 | 6/2006 | Decary et al. |
| 7,069,308 | B2 | 6/2006 | Abrams |
| 7,073,129 | B1 | 7/2006 | Robarts et al. |
| 7,110,776 | B2 | 9/2006 | Sambin |
| 7,143,091 | B2 | 11/2006 | Charnock et al. |
| 7,149,696 | B2 | 12/2006 | Shimizu et al. |
| 7,181,438 | B1 | 2/2007 | Szabo |
| 7,185,286 | B2 | 2/2007 | Zondervan |
| 7,194,512 | B1 | 3/2007 | Creemer et al. |
| 7,203,597 | B2 | 4/2007 | Sato et al. |
| 7,209,915 | B1 | 4/2007 | Taboada et al. |
| 7,219,013 | B1 | 5/2007 | Young et al. |
| 7,236,969 | B1 | 6/2007 | Skillen et al. |
| 7,254,581 | B2 | 8/2007 | Johnson et al. |
| 7,257,570 | B2 | 8/2007 | Riise et al. |
| 7,305,445 | B2 | 12/2007 | Singh et al. |
| 7,320,025 | B1 | 1/2008 | Steinberg et al. |
| 7,343,364 | B2 | 3/2008 | Bram et al. |
| 7,395,507 | B2 | 7/2008 | Robarts et al. |
| 7,404,084 | B2 | 7/2008 | Fransdonk |
| 7,437,312 | B2 | 10/2008 | Bhatia et al. |
| 7,451,102 | B2 | 11/2008 | Nowak |
| 7,461,168 | B1 | 12/2008 | Wan |
| 7,496,548 | B1 | 2/2009 | Ershov |
| 7,522,995 | B2 | 4/2009 | Nortrup |
| 7,529,811 | B2 | 5/2009 | Thompson |
| 7,562,122 | B2 | 7/2009 | Oliver et al. |
| 7,577,665 | B2 | 8/2009 | Rameer et al. |
| 7,584,215 | B2 | 9/2009 | Saari et al. |
| 7,624,104 | B2 | 11/2009 | Berkhin et al. |
| 7,624,146 | B1 | 11/2009 | Brogne et al. |
| 7,634,465 | B2 | 12/2009 | Sareen et al. |
| 7,657,907 | B2 | 2/2010 | Fennan et al. |
| 7,681,147 | B2 | 3/2010 | Richardson-Bunbury et al. |
| 7,725,492 | B2 | 5/2010 | Sittig et al. |
| 7,729,901 | B2 | 6/2010 | Richardson-Bunbury et al. |
| 7,769,740 | B2 | 8/2010 | Martinez |
| 7,769,745 | B2 | 8/2010 | Mor Naaman |
| 7,783,622 | B1 | 8/2010 | Vandermolen et al. |
| 7,792,040 | B2 | 9/2010 | Nair |
| 7,802,724 | B1 | 9/2010 | Nohr |
| 7,822,871 | B2 | 10/2010 | Stolorz et al. |
| 7,831,586 | B2 | 11/2010 | Reitter et al. |
| 7,865,308 | B2 | 1/2011 | Athsani |
| 7,925,708 | B2 | 4/2011 | Davis |
| 2001/0013009 | A1 | 8/2001 | Greening et al. |
| 2001/0035880 | A1 | 11/2001 | Musatov et al. |
| 2001/0047384 | A1 | 11/2001 | Croy |
| 2001/0052058 | A1 | 12/2001 | Ohran |
| 2002/0014742 | A1 | 2/2002 | Conte et al. |
| 2002/0019849 | A1 | 2/2002 | Tuvey et al. |
| 2002/0019857 | A1 | 2/2002 | Harjanto |
| 2002/0023091 | A1 | 2/2002 | Silberberg et al. |
| 2002/0023230 | A1 | 2/2002 | Bolnick et al. |
| 2002/0035605 | A1 | 3/2002 | McDowell et al. |
| 2002/0049968 | A1 | 4/2002 | Wilson et al. |
| 2002/0052785 | A1 | 5/2002 | Smith et al. |
| 2002/0052786 | A1 | 5/2002 | Kim et al. |
| 2002/0054089 | A1 | 5/2002 | Nicholas |
| 2002/0065844 | A1 | 5/2002 | Robinson et al. |
| 2002/0069218 | A1 | 6/2002 | Sull et al. |
| 2002/0099695 | A1 | 7/2002 | Abaijian et al. |
| 2002/0103870 | A1 | 8/2002 | Shouji |
| 2002/0111956 | A1 | 8/2002 | Yeo et al. |
| 2002/0112035 | A1 | 8/2002 | Carey |
| 2002/0133400 | A1 | 9/2002 | Terry et al. |
| 2002/0138331 | A1 | 9/2002 | Hosea et al. |
| 2002/0152267 | A1 | 10/2002 | Lennon |
| 2002/0169840 | A1 | 11/2002 | Sheldon et al. |
| 2002/0173971 | A1 | 11/2002 | Stirpe et al. |
| 2002/0178161 | A1 | 11/2002 | Brezin et al. |
| 2002/0198786 | A1 | 12/2002 | Tripp et al. |
| 2003/0008661 | A1 | 1/2003 | Joyce et al. |
| 2003/0009367 | A1 | 1/2003 | Morrison |
| 2003/0009495 | A1 | 1/2003 | Adjaoute |
| 2003/0027558 | A1 | 2/2003 | Eisinger |
| 2003/0032409 | A1 | 2/2003 | Hutcheson et al. |
| 2003/0033331 | A1 | 2/2003 | Sena et al. |
| 2003/0033394 | A1 | 2/2003 | Stine et al. |
| 2003/0065762 | A1 | 4/2003 | Stolorz et al. |
| 2003/0069877 | A1 | 4/2003 | Grefenstette et al. |
| 2003/0069880 | A1 | 4/2003 | Harrison et al. |
| 2003/0078978 | A1 | 4/2003 | Lardin et al. |
| 2003/0080992 | A1 | 5/2003 | Haines |
| 2003/0126250 | A1 | 7/2003 | Jhanji |
| 2003/0149574 | A1 | 8/2003 | Rudman |
| 2003/0154293 | A1 | 8/2003 | Zmolek |
| 2003/0165241 | A1 | 9/2003 | Fransdonk |
| 2003/0191816 | A1 | 10/2003 | Landress et al. |
| 2004/0010492 | A1 | 1/2004 | Zhao et al. |
| 2004/0015588 | A1 | 1/2004 | Cotte |
| 2004/0030798 | A1 | 2/2004 | Andersson et al. |
| 2004/0034752 | A1 | 2/2004 | Ohran |
| 2004/0043758 | A1 | 3/2004 | Sorvari et al. |
| 2004/0044736 | A1 | 3/2004 | Austin-Lane et al. |
| 2004/0070602 | A1 | 4/2004 | Kobuya et al. |

(56) References Cited

U.S. PATENT DOCUMENTS

| | | |
|---|---|---|
| 2004/0139025 A1 | 7/2004 | Coleman |
| 2004/0139047 A1 | 7/2004 | Rechsteiner |
| 2004/0148341 A1 | 7/2004 | Cotte |
| 2004/0152477 A1 | 8/2004 | Wu et al. |
| 2004/0183829 A1 | 9/2004 | Kontny et al. |
| 2004/0201683 A1 | 10/2004 | Murashita et al. |
| 2004/0203851 A1 | 10/2004 | Vetro et al. |
| 2004/0203909 A1 | 10/2004 | Koster |
| 2004/0209602 A1 | 10/2004 | Joyce et al. |
| 2004/0243623 A1 | 12/2004 | Ozer et al. |
| 2004/0260804 A1 | 12/2004 | Grabarnik et al. |
| 2004/0267880 A1 | 12/2004 | Patiejunas |
| 2005/0005242 A1 | 1/2005 | Hoyle |
| 2005/0015451 A1 | 1/2005 | Sheldon et al. |
| 2005/0015599 A1 | 1/2005 | Wang et al. |
| 2005/0050027 A1 | 3/2005 | Yeh |
| 2005/0050043 A1 | 3/2005 | Pyhalammi et al. |
| 2005/0055321 A1 | 3/2005 | Fratkina |
| 2005/0060381 A1 | 3/2005 | Huynh et al. |
| 2005/0065950 A1 | 3/2005 | Chaganti et al. |
| 2005/0065980 A1 | 3/2005 | Hyatt et al. |
| 2005/0076060 A1 | 4/2005 | Finn et al. |
| 2005/0086187 A1 | 4/2005 | Grosser et al. |
| 2005/0105552 A1 | 5/2005 | Osterling |
| 2005/0108213 A1 | 5/2005 | Riise et al. |
| 2005/0120006 A1 | 6/2005 | Nye |
| 2005/0131727 A1 | 6/2005 | Sezan et al. |
| 2005/0149397 A1 | 7/2005 | Morgenstern et al. |
| 2005/0151849 A1 | 7/2005 | Fitzhugh et al. |
| 2005/0159220 A1 | 7/2005 | Wilson et al. |
| 2005/0159970 A1 | 7/2005 | Buyukkokten et al. |
| 2005/0160080 A1 | 7/2005 | Dawson |
| 2005/0165699 A1 | 7/2005 | Hahn-Carlson |
| 2005/0166240 A1 | 7/2005 | Kim |
| 2005/0171955 A1 | 8/2005 | Hull et al. |
| 2005/0177385 A1 | 8/2005 | Hull et al. |
| 2005/0182824 A1 | 8/2005 | Cotte |
| 2005/0183110 A1 | 8/2005 | Anderson |
| 2005/0187786 A1 | 8/2005 | Tsai |
| 2005/0192025 A1 | 9/2005 | Kaplan |
| 2005/0203801 A1 | 9/2005 | Morgenstern et al. |
| 2005/0216295 A1 | 9/2005 | Abrahamsohn |
| 2005/0216300 A1 | 9/2005 | Appelman et al. |
| 2005/0219375 A1 | 10/2005 | Hasegawa et al. |
| 2005/0234781 A1 | 10/2005 | Morgenstern |
| 2005/0273510 A1 | 12/2005 | Schuh |
| 2006/0020631 A1 | 1/2006 | Cheong Wan et al. |
| 2006/0026013 A1 | 2/2006 | Kraft |
| 2006/0026067 A1 | 2/2006 | Nicholas et al. |
| 2006/0031108 A1 | 2/2006 | Oran |
| 2006/0040719 A1 | 2/2006 | Plimi |
| 2006/0047563 A1 | 3/2006 | Wardell |
| 2006/0047615 A1 | 3/2006 | Ravin |
| 2006/0053058 A1 | 3/2006 | Hotchkiss et al. |
| 2006/0059087 A1* | 3/2006 | Smith et al. ............. 705/40 |
| 2006/0069612 A1 | 3/2006 | Hurt et al. |
| 2006/0069616 A1 | 3/2006 | Bau |
| 2006/0069749 A1 | 3/2006 | Herz et al. |
| 2006/0074853 A1 | 4/2006 | Liu et al. |
| 2006/0085392 A1 | 4/2006 | Wang et al. |
| 2006/0085419 A1 | 4/2006 | Rosen |
| 2006/0089876 A1 | 4/2006 | Boys |
| 2006/0116924 A1 | 6/2006 | Angeles et al. |
| 2006/0123053 A1 | 6/2006 | Scannell, Jr. |
| 2006/0129313 A1 | 6/2006 | Becker |
| 2006/0129605 A1 | 6/2006 | Doshi |
| 2006/0161894 A1 | 7/2006 | Oustiougov et al. |
| 2006/0168591 A1 | 7/2006 | Hunsinger et al. |
| 2006/0173838 A1 | 8/2006 | Garg et al. |
| 2006/0173985 A1 | 8/2006 | Moore |
| 2006/0178822 A1 | 8/2006 | Lee |
| 2006/0184508 A1 | 8/2006 | Fuselier et al. |
| 2006/0184579 A1 | 8/2006 | Mills |
| 2006/0212330 A1 | 9/2006 | Savilampi |
| 2006/0212401 A1 | 9/2006 | Amerally et al. |
| 2006/0227945 A1 | 10/2006 | Runge et al. |
| 2006/0235816 A1 | 10/2006 | Yang et al. |
| 2006/0236257 A1 | 10/2006 | Othmer et al. |
| 2006/0242139 A1 | 10/2006 | Butterfield et al. |
| 2006/0242178 A1 | 10/2006 | Butterfield et al. |
| 2006/0242259 A1 | 10/2006 | Vallath et al. |
| 2006/0258368 A1 | 11/2006 | Granito et al. |
| 2006/0282455 A1 | 12/2006 | Lee |
| 2007/0013560 A1 | 1/2007 | Casey |
| 2007/0015519 A1 | 1/2007 | Casey |
| 2007/0043766 A1 | 2/2007 | Nicholas et al. |
| 2007/0067104 A1 | 3/2007 | Mays |
| 2007/0067267 A1 | 3/2007 | Ives |
| 2007/0072591 A1 | 3/2007 | McGary et al. |
| 2007/0073583 A1 | 3/2007 | Grouf et al. |
| 2007/0086061 A1 | 4/2007 | Robbins |
| 2007/0087756 A1 | 4/2007 | Hoffberg |
| 2007/0088852 A1 | 4/2007 | Levkovitz |
| 2007/0100956 A1 | 5/2007 | Kumar |
| 2007/0112762 A1 | 5/2007 | Brubaker |
| 2007/0121843 A1 | 5/2007 | Atazky et al. |
| 2007/0130137 A1 | 6/2007 | Oliver et al. |
| 2007/0136048 A1 | 6/2007 | Richardson-Bunbury et al. |
| 2007/0136235 A1 | 6/2007 | Hess |
| 2007/0136256 A1 | 6/2007 | Kapur et al. |
| 2007/0136689 A1 | 6/2007 | Richardson-Bunbury et al. |
| 2007/0143345 A1 | 6/2007 | Jones et al. |
| 2007/0150168 A1 | 6/2007 | Balcom et al. |
| 2007/0150359 A1 | 6/2007 | Lim et al. |
| 2007/0155411 A1 | 7/2007 | Morrison |
| 2007/0161382 A1 | 7/2007 | Melinger et al. |
| 2007/0162850 A1 | 7/2007 | Adler |
| 2007/0168430 A1 | 7/2007 | Brun et al. |
| 2007/0173266 A1 | 7/2007 | Barnes |
| 2007/0179792 A1 | 8/2007 | Kramer |
| 2007/0185599 A1 | 8/2007 | Robinson et al. |
| 2007/0192299 A1 | 8/2007 | Zuckerberg et al. |
| 2007/0198506 A1 | 8/2007 | Attaran Rezaei et al. |
| 2007/0198563 A1 | 8/2007 | Apparao et al. |
| 2007/0203591 A1 | 8/2007 | Bowerman |
| 2007/0219708 A1 | 9/2007 | Brasche et al. |
| 2007/0073641 A1 | 10/2007 | Perry et al. |
| 2007/0233585 A1 | 10/2007 | Ben Simon et al. |
| 2007/0239348 A1 | 10/2007 | Cheung |
| 2007/0239517 A1 | 10/2007 | Chung et al. |
| 2007/0259653 A1 | 11/2007 | Tang et al. |
| 2007/0260508 A1 | 11/2007 | Barry et al. |
| 2007/0260604 A1 | 11/2007 | Haeuser et al. |
| 2007/0271297 A1 | 11/2007 | Jaffe et al. |
| 2007/0271340 A1 | 11/2007 | Goodman et al. |
| 2007/0273758 A1 | 11/2007 | Mendoza et al. |
| 2007/0276940 A1 | 11/2007 | Abraham et al. |
| 2007/0282621 A1 | 12/2007 | Altman et al. |
| 2007/0282675 A1 | 12/2007 | Varghese |
| 2007/0288278 A1 | 12/2007 | Alexander et al. |
| 2008/0005313 A1 | 1/2008 | Flake et al. |
| 2008/0005651 A1 | 1/2008 | Grefenstette et al. |
| 2008/0010206 A1 | 1/2008 | Coleman |
| 2008/0021957 A1 | 1/2008 | Medved et al. |
| 2008/0026804 A1 | 1/2008 | Baray et al. |
| 2008/0028031 A1 | 1/2008 | Bailey et al. |
| 2008/0040283 A1 | 2/2008 | Morris |
| 2008/0046298 A1 | 2/2008 | Ben-Yehuda et al. |
| 2008/0070588 A1 | 3/2008 | Morin |
| 2008/0086356 A1 | 4/2008 | Glassman et al. |
| 2008/0086431 A1 | 4/2008 | Robinson et al. |
| 2008/0091796 A1 | 4/2008 | Story et al. |
| 2008/0096664 A1 | 4/2008 | Baray et al. |
| 2008/0102911 A1 | 5/2008 | Campbell et al. |
| 2008/0104061 A1 | 5/2008 | Rezaei |
| 2008/0104227 A1 | 5/2008 | Birnie et al. |
| 2008/0109761 A1 | 5/2008 | Stambaugh |
| 2008/0109843 A1 | 5/2008 | Ullah |
| 2008/0114751 A1 | 5/2008 | Cramer et al. |
| 2008/0120183 A1 | 5/2008 | Park |
| 2008/0120308 A1 | 5/2008 | Martinez et al. |
| 2008/0120690 A1 | 5/2008 | Norlander et al. |
| 2008/0133750 A1 | 6/2008 | Grabarnik et al. |
| 2008/0147655 A1 | 6/2008 | Sinha et al. |

(56) References Cited

U.S. PATENT DOCUMENTS

| | | |
|---|---|---|
| 2008/0147743 A1 | 6/2008 | Taylor et al. |
| 2008/0148175 A1 | 6/2008 | Naaman et al. |
| 2008/0154720 A1 | 6/2008 | Gounares |
| 2008/0163284 A1 | 7/2008 | Martinez et al. |
| 2008/0172632 A1 | 7/2008 | Stambaugh |
| 2008/0177706 A1 | 7/2008 | Yuen |
| 2008/0270579 A1 | 10/2008 | Herz et al. |
| 2008/0285886 A1 | 11/2008 | Allen |
| 2008/0301250 A1 | 12/2008 | Hardy et al. |
| 2008/0320001 A1 | 12/2008 | Gaddam |
| 2009/0005987 A1 | 1/2009 | Vengroff et al. |
| 2009/0006336 A1 | 1/2009 | Forstall et al. |
| 2009/0012934 A1 | 1/2009 | Yerigan |
| 2009/0012965 A1 | 1/2009 | Franken |
| 2009/0043844 A1 | 2/2009 | Zimmet et al. |
| 2009/0044132 A1 | 2/2009 | Combel et al. |
| 2009/0063254 A1 | 3/2009 | Paul et al. |
| 2009/0070186 A1 | 3/2009 | Buiten et al. |
| 2009/0073191 A1 | 3/2009 | Smith et al. |
| 2009/0076889 A1 | 3/2009 | Jhanji |
| 2009/0100052 A1 | 4/2009 | Stern et al. |
| 2009/0106356 A1 | 4/2009 | Brase et al. |
| 2009/0125517 A1 | 5/2009 | Krishnaswamy et al. |
| 2009/0132941 A1 | 5/2009 | Pilskalns et al. |
| 2009/0144141 A1 | 6/2009 | Dominowska et al. |
| 2009/0150501 A1 | 6/2009 | Davis et al. |
| 2009/0150507 A1 | 6/2009 | Davis et al. |
| 2009/0165051 A1 | 6/2009 | Armaly |
| 2009/0171939 A1 | 7/2009 | Athsani et al. |
| 2009/0177603 A1 | 7/2009 | Honisch |
| 2009/0187637 A1 | 7/2009 | Wu et al. |
| 2009/0204484 A1 | 8/2009 | Johnson |
| 2009/0204672 A1 | 8/2009 | Jetha et al. |
| 2009/0204676 A1 | 8/2009 | Parkinson et al. |
| 2009/0216606 A1 | 8/2009 | Coffman et al. |
| 2009/0222302 A1 | 9/2009 | Higgins |
| 2009/0222303 A1 | 9/2009 | Higgins |
| 2009/0234814 A1 | 9/2009 | Boerries et al. |
| 2009/0234909 A1 | 9/2009 | Strandeil et al. |
| 2009/0249482 A1 | 10/2009 | Sarathy |
| 2009/0265431 A1 | 10/2009 | Janie et al. |
| 2009/0281997 A1 | 11/2009 | Jain |
| 2009/0299837 A1 | 12/2009 | Steelberg et al. |
| 2009/0313546 A1 | 12/2009 | Katpelly et al. |
| 2009/0320047 A1 | 12/2009 | Khan et al. |
| 2009/0323519 A1 | 12/2009 | Pun |
| 2009/0328087 A1 | 12/2009 | Higgins et al. |
| 2010/0002635 A1 | 1/2010 | Eklund |
| 2010/0014444 A1 | 1/2010 | Ghanadan et al. |
| 2010/0049599 A1* | 2/2010 | Owen et al. ............. 705/14.4 |
| 2010/0063993 A1 | 3/2010 | Higgins et al. |
| 2010/0070368 A1 | 3/2010 | Choi et al. |
| 2010/0118025 A1 | 5/2010 | Smith et al. |
| 2010/0125563 A1 | 5/2010 | Nair et al. |
| 2010/0125569 A1 | 5/2010 | Nair et al. |
| 2010/0125604 A1 | 5/2010 | Martinez et al. |
| 2010/0125605 A1 | 5/2010 | Nair et al. |
| 2010/0185642 A1 | 7/2010 | Higgins et al. |
| 2010/0223094 A1* | 9/2010 | Cumming et al. ............. 705/10 |
| 2010/0323716 A1* | 12/2010 | Jaffri ............. 455/456.1 |

FOREIGN PATENT DOCUMENTS

| | | |
|---|---|---|
| KR | 1020000036897 | 7/2000 |
| KR | 1020000054319 | 9/2000 |
| KR | 10-2000-0064105 | 11/2000 |
| KR | 1020030049173 | 6/2003 |
| KR | 10-0801662 | 2/2005 |
| KR | 1020060043333 | 5/2006 |
| KR | 102007034094 | 3/2007 |
| KR | 1020070073180 | 7/2007 |
| KR | 1020080048802 | 6/2008 |
| WO | WO2006/116196 | 11/2006 |
| WO | WO 2007/022137 | 2/2007 |
| WO | WO 2007/027453 | 3/2007 |
| WO | WO 2007070358 | 6/2007 |
| WO | WO2007113546 | 10/2007 |

OTHER PUBLICATIONS

U.S. Appl. No. 11/562,973, filed Nov. 22, 2006, Martinez.
U.S. Appl. No. 11/562,974, filed Nov. 22, 2006, Martinez.
U.S. Appl. No. 11/562,976, filed Nov. 22, 2006, Martinez.
U.S. Appl. No. 11/562,979, filed Nov. 22, 2006, Martinez.
U.S. Appl. No. 12/237,709, filed Sep. 25, 2008, Martinez.
U.S. Appl. No. 12/399,669, filed Mar. 6, 2009, King.
U.S. Appl. No. 11/353,657, filed Feb. 13, 2006, Mor Naaman.
U.S. Appl. No. 11/437,344, filed May 19, 2006, Jaffe.
U.S. Appl. No. 11/593,869, filed Nov. 6, 2006, Mor Naaman.
U.S. Appl. No. 11/593,668, filed Nov. 6, 2006, Mor Naaman.
Allen James F., "Maintaining Knowledge About Temporal Intervals", Communications of the ACM, Nov. 1983, vol. 26, No. 11 pp. 832-843; 12 pages.
Press Release, "QUALCOMM Conducts First Live Demonstration of FL Technology on a Wireless Handset", Qualcomm Inc., San Diego, Sep. 27, 2005; 3 pages.
MediaFlo, FLO Technology Overview, Qualcomm Inc. Copyright 2007; 24 pages.
Axup, Jeff et al., "Conceptualizing New Mobile Devices by Observing Gossip and Social Network Formation Amongst the Extremely Mobile", ITEE Technical Report #459, Dec. 19, 2005, pp. 1-71.
Conhaim, Wallys W., "Social networks: the Internet continues to evolve: where is the money in all this? That is what venture capitalists are asking. (Perspectives)", Information Today, 22, 9, 35(2), Oct. 2005, (pp. 1-5 of attached).
Davis, Marc et al., "From Context to Content: Leveraging Context to Infer Media Metadata", ACM Press, Oct. 10, 2004, pp. 1-8.
Kaasinen, E., "Behaviour & Information Technology", Taylor & Francis, vol. 24, No. 1, Jan/Feb. 2005, pp. 37-49, (Abstract only attached).
Konomi, Shin'ichi et al., "Supporting Colocated Interactions Using RFID and Social Network Displays", Pervasive Computing, Jul.-Sep. 2006 , vol. 5, No. 3, pp. 48-56 (pp. 1-4 of attached).
Lin, F. et al., "A unified framework for managing Web-based services.", Information Systems and e-Business Management, vol. 3, Oct. 2005, p. 299, (pp. 1-15 of attached).
Metz, Cade, "MySpace Nation", PC Magazine, Jun. 21, 2006, pp. 1-10 attached.
Perkowitz, Mike et al., "Utilizing Online Communities to Facilitate Physical World Interactions", The International Conference on Communities and Technologies, Sep. 19, 2003, Amsterdam, pp. 1 6.
Roush, Wade, "Social Machines", Continuous Computing Blog, Jul. 5, 2005, pp. 1-21.
Roush, Wade, "Social Machines", Technology Review, Aug. 2005, pp. 45-51.
Sheppard, Brett, "The Rights Stuff: The Integration of Enterprise Digital Rights Management Into an Enterprise Architecture", ECantent, vol. 29, No. 9, Nov. 2006, p. 38, 40-44, (pp. 1-7 of attached).
Voight, Joan et al., "Lessons for Today's Digital Market", Adweekcom, Oct. 2, 2006, pp. 1-6.
"Companies add new communication features to photo sharing.", Digital Imaging Digest, Feb. 2006, pp. 1-2.
"Dave.Tv and Eye Music Network Empower Users to Create Their Own Music TV Channel on Their Sites With New IPTV Channel", www.davenw.com/2006, Sep. 13, 2006, pp. 1-2.
"Digital rights management: a primer: developing a user-friendly means of protecting content.(Profile)", Screen Digest, No. 420, p. 305, Sep. 2006, (pp. 1-9 of attached).
"Emerging Markets: What media 2.0 can offer advertisers.", Campaign, Oct. 27, 2006, p. 26, (pp. 1-5 of attached).
"Reality Digital Debuts Opus", www.lightreading.com. Sep. 25, 2006, pp. 1.
"Reality Digital—Making Media Move", www.realitydigital.com, Nov. 28, 2006, pp. 1-2.

(56) References Cited

OTHER PUBLICATIONS

Notification of Transmittal of the International Search Report and the Written Opinion of the International Search Authority, or Declaration (PCT/US2007/'084797) dated Mar. 21, 2008; 11 pages.
International Search Report (PCT/US2007/084807) dated May 27, 2008; 3 pages.
International Preliminary Report on Patentability (PCT/US2007/084807) dated May 26, 2009; 5 pages.
International Search Report (PCT/US2010/026063) dated May 27, 2008; 3 pages.
Rekimoto, et al., "CyberCode: designing augmented reality environments with visual tags." Proceedings of DARE 2000 on Designing augmented reality environments, Elsinore, Denmark, pp. 1-11 Apr. 12-14, 2000.
"Semacode-URL Barcodes-practical ubiquitous computing", located at http://semacode.org visited on Apr. 13, 2007; 3 pages.
"Technical White Paper: Choosing the best 2D barcode format for mobile apps," Semacode, Jul. 15, 2006; pp. 1-7 located at http://semacode.org/about/technical/whitepaper/best2_d_code.pdf.
Carbonell, J. et al. (Aug. 24-28, 1998). "The Use of MMR, Diversity-Based Reranking for Reordering Documents and Producing Summaries," SIGIR '98: Proceedings of the 21 S Annual International ACM SIGIR Conference on Research and Development in Information Retrieval: Melbourne, Australia W.B. Croft et al. eds., pp. 335-336.
Cooper, M. et al. (Nov. 2-8, 2003). "Temporal Event Clustering for Digital Photo Collections," MM'03 Berkeley, California, pp. 364-373.
Davis, M. et al. (Oct. 10-16, 2004). "From Context to Content: Leveraging Context to Infer Media Metadata," MM'04 New York, New York. 9 pages.
Davis, M. et al. "From Context to Content: Leveraging Context for Mobile Media Metadata." 9 pages.
Davis. M. et al. (Apr. 2-7, 2005). "MMM2: Mobile Media Metadata for Media Sharing," CHI 2005 Portland, Oregon. 4 pages.
Davis, M. et al. "Mobile Media Metadata for Mobile Imaging." Jun. 27-30, 2004; 4 pages.
Davis, M. et al. "Using Context and Similarity for Face and Location Identification." 10 pages.
Flickr. Welcome to Flickr—Photo Sharing, located at <http://www.flickr.com > visited on Feb. 26, 2007, one page.
Gargi, U. (Aug. 7, 2003). "Consumer Media Capture: Time-Based Analysis and Event Clustering," Technical Report HPL-2003-165 HP Laboratories Palo Alto, pp. 1-15.
Goldberger, J. et al. The Hungarian Clustering Method, located at <http://scholar.googles.com/scholar?num=20&h1=en&lr=&9=cache:vbwslsm1CisJ:www.openu .acil/Personal_sites/tarnirtassa/Publications/hcm.pdf+goldberger+clustering+method+hungarian> visited on Mar. 1, 2007, twelve pages.
Graham, A. et al. (Jul. 13-17, 2002). Time as Essence for Photo Browsing Through Personal Digital Libraries, JCDL '02 Portland, Oregon. 11 pages.
Jaffe, A. et al. (May 23-26, 2006). "Generating Summaries for Large Collections of Geo-Referenced Photographs," WWW 2006 Edinburgh, Scotland. 2 pages.
Jaffe, A. et al. (Oct. 26-27, 2006). "Generating Summaries and Visualization for Large Collections of Geo-Referenced Photographs," MIR '06 Santa Barbara, California. 11 pages.
Joshi, D. et al. (Oct. 15-16, 2004). "The Story Picturing Engine: Finding Elite Images to Illustrate a Story Using Miitual Reinforcement," MIR '04 New York, New York. 9 pages.
Naaman, M. et al. (Nov. 2003). "From Where to What: Metadata Sharing for Digital Photographs with Geographic Coordinates," In on the Move to Meaningful Internet Systems 2003: Coop/S, DOA, and ODBASE R. Meersman et al. eds., pp. 196-217.
Naaman, M. et al. (Jun. 7-11, 2004). "Automatic Organization for Digital Photographs with Geographic Coordinates" Proceedings of the Fourth ACM/IEEE Joint Conference on Digital Libraries Global Reach and Diverse Impact: Tucson, Arizona, pp. 53-62.

Nair, R. et al. (Nov. 6-11, 2005). "Photo L01: Browsing Multi-User Photo Collections," MM'05 Singapore, pp. 223-224.
0' Hare, N. et al. "Combination of Content Analysis and Context Features for Digital Photograph Retrieval." 7 pages.
Pigeau, A. et al. (Jun. 17, 2005). "Organizing a Personal Image Collection with Statistical Model-Based ICL Clustering on Spatio-Temporal Camera Phone Meta-Data." 25 pages.
Sarvas, R. et al. (Jun. 6-9, 2004). "Metadata Creation System for Mobile Images," MobiSys'04 Boiton, Massachusetts, pp. 36-48.
Toyama, K. et al. (Nov. 2-8, 2003). "Geographic Location Tags on Digital Images," MM '03'Berkeley: California. 12 pages.
U.S. Appl. No. 12/241,590, filed Sep. 30, 2008, Athsani.
U.S. Appl. No. 12/409,867, filed Mar. 24, 2009, King.
U.S. Appl. No. 12/540,098, filed Aug. 12, 2009, Martinez.
U.S. Appl. No. 12/540,588, filed Aug. 13, 2009, Tendjoukian.
U.S. Appl. No. 12/015,115, filed Jan. 16, 2006, Higgins.
U.S. Appl. No. 12/180,486, filed Jul. 25, 2008, Higgins.
U.S. Appl. No. 12/180,499, filed Jul. 25, 2008, Higgins.
U.S. Appl. No. 12/015,146, filed Jan. 16, 2008, Higgins.
U.S. Appl. No. 12/041,088, filed Mar. 3, 2008, Higgins.
U.S. Appl. No. 12/041,062, filed Mar. 3, 2008, Higgins.
U.S. Appl. No. 12/041,054, filed Mar. 3, 2008, Higgins.
U.S. Appl. No. 12/540,269, filed Aug. 12, 2009, Kalaboukis.
U.S. Appl. No. 11/969,815, filed Jan. 4, 2004, Davis.
U.S. Appl. No. 12/182,111, filed Jul. 29, 2008, Davis.
U.S. Appl. No. 12/434,575, filed May 1, 2009, O'Sullivan.
U.S. Appl. No. 12/434,580, filed May 1, 2009, O'Sullivan.
U.S. Appl. No. 12/407,690, filed Mar. 19, 2009, Davis.
U.S. Appl. No. 12/407,681, filed Mar. 19, 2009, Athsani.
International Search Report (PCT/US2009/030405) dated Sep. 23, 2009; 2 pages.
U.S. Appl. No. 12/041,054 file history dated Mar. 3, 2008; 64 pgs.
U.S. Appl. No. 12/041,062 file history dated Mar. 3, 2008; 66 pgs.
U.S. Appl. No. 12/041,088 file history dated Mar. 3, 2008; 66 pgs.
U.S. Appl. No. 12/169,931 file history dated Jul. 9, 2008; 66 pgs.
U.S. Appl. No. 12/170,025 file history dated Jul. 9, 2008; 67 pgs.
U.S. Appl. No. 12/180,499 file history dated Jul. 25, 2008; 67 pgs.
U.S. Appl. No. 12/180,486 file history dated Jul. 25, 2008; 65 pgs.
International Search Report PCT/US2009/030406 dated Sep. 29, 2009; 5 pages.
International Search Report and Written Opinion PCT/US2009/034445 dated Oct. 12, 2009; 7 pages.
Office Action U.S. Appl. No. 12/041,054 dated Oct. 27, 2010; 15 pages.
Office Action U.S. Appl. No. 12/041,062 dated Oct. 28, 2010; 12 pages.
International Search Report PCT/US2009/034444 dated Sep. 18, 2009; 2 pages.
Office Action U.S. Appl. No. 12/041,088 dated Oct. 4, 2010; 18 pages.
U.S. Appl. No. 12/273,259, filed Dec. 6, 2007, Davis.
U.S. Appl. No. 11/958,157, filed Dec. 17, 2007, Hayashi.
U.S. Appl. No. 11/952,875, filed Dec. 7, 2007, Davis.
U.S. Appl. No. 11/960,368, filed Dec. 19, 2007, Madsen.
U.S. Appl. No. 11/952,007, filed Dec. 6, 2007, Davis.
U.S. Appl. No. 11/953,454, filed Dec. 10, 2007, Davis.
U.S. Appl. No. 11/953,494, filed Dec. 10, 2007, Davis.
U.S. Appl. No. 12/059,594, filed Mar. 31, 2008, Martinez.
U.S. Appl. No. 12/236,668, filed Sep. 24, 2008, Davis.
U.S. Appl. No. 12/057,943, filed Mar. 28, 2008, Martinez.
U.S. Appl. No. 12/057,878, filed Mar. 28, 2008, Martinez.
U.S. Appl. No. 11/969,751, filed Jan. 4, 2008, Martinez.
U.S. Appl. No. 12/163,249, filed Jun. 27, 2008, Kalaboukis.
U.S. Appl. No. 12/145,145, filed Jun. 24, 2008, Davis.
U.S. Appl. No. 12/182,813, filed Jul. 30, 2008, Higgins.
U.S. Appl. No. 12/182,969, filed Jun. 27, 2008, Higgins.
U.S. Appl. No. 12/163,314, filed Jun. 27, 2008, Higgins.
U.S. Appl. No. 12/163,396, filed Jun. 27, 2008, Higgins.
U.S. Appl. No. 12/195,969, filed Aug. 21, 2008, Martinez.
U.S. Appl. No. 12/234,000, filed Sep. 19, 2008, Martinez.
U.S. Appl. No. 12/241,687, filed Sep. 30, 2008, Davis.
U.S. Appl. No. 12/206,172, filed Sep. 8, 2008, Higgins.
U.S. Appl. No. 12/273,291, filed Nov. 18, 2008, Nair.

(56) References Cited

OTHER PUBLICATIONS

U.S. Appl. No. 12/273,317, filed Nov. 18, 2008, Nair.
U.S. Appl. No. 12/273,345, filed Nov. 18, 2008, Nair.
U.S. Appl. No. 12/273,371, filed Nov. 18, 2008, Nair.
U.S. Appl. No. 12/241,198, filed Sep. 30, 2008, Higgins.
U.S. Appl. No. 12/339,355, filed Dec. 19, 2008, Higgins.
U.S. Appl. No. 12/329,038, filed Dec. 5, 2008, Higgins.
U.S. Appl. No. 12/326,553, filed Dec. 2, 2008, Churchill.
U.S. Appl. No. 12/242,656, filed Sep. 30, 2008, Burgener.
U.S. Appl. No. 12/357,311, filed Jan. 21, 2009, Higgins.
U.S. Appl. No. 12/357,332, filed Jan. 21, 2009, Higgins.
U.S. Appl. No. 12/357,345, filed Jan. 21, 2009, Higgins.
U.S. Appl. No. 12/357,285, filed Jan. 21, 2009, Higgins.
U.S. Appl. No. 11/593,668, filed Nov. 6, 2006 for Naaman, et al.
U.S. Appl. No. 11/593,869, filed Nov. 6, 2006 for Naaman, et al.
"Gutenkarte" Book Catalog, 2006 MetaCarta, Inc., www.gutenkarte.org 11pgs.
Baron, N.S. et al. (Aug. 30, 2005). "Tethered or Mobile? Use of Away Messages in Instant Messaging by American College Students," Chapter 20.1 in Mobile Communication, Springer: London, England, 31:293-297.
Jones, C. et al. (2004). "Ad-Hoc Meeting System," Final Presentation from Project Group #7, SIMS 202, Fall 2004 Class, UC Berkley School of Information Management & Systems, located at <http://www2.sims.berkeley.edu/academics/courses/is202/f04/phone_project/Group7/ >, last visited on Feb. 2, 2010, thirteen pages.
Manguy, L. et al. (2006). "iTour—Packing the World Into Your Mobile Device," Final Presentation from Project Group #6, SIMS 202, Fall 2004 Class, UC Berkley School of Information Management & Systems, located at <http://www2.sims.berkeley.edu/academics/courses/is202/f04/phone_project/Group6/index.h > . . . , last visited on Feb. 2, 2010, ten pages.
Mitnick, S. et al. (2004). "Pillbox," Final Presentation from Project Group #8, SIMS: 02: Fall 2004 Class, UC Berkley School of Information Management & Systems, located at <http://www2.sims.berkeley.edu/academics/courses/is202/f04/phone_project/Group8/about.p . . . ,> last visited on Feb. 2, 2010, seventeen pages.
Wooldridge, M. et al. (2005). "STALK. The Camera-phone Scavenger Hunt!" located at <http://www.stalk.com >, last visited on Dec. 28, 2009, two pages.
www.stalk.com (retrieved on Dec. 29, 2009) pp. 1-2.
Anonymous. (Date Unknown). "CommunityWalk—About," located at <http://www.communitywalk.com/about >, last visited on Mar. 3, 2008, one page.
Anonymous. (Date Unknown). "CommunityWalk Mapping Made Easy," located at <http://www.communitywalk.com/>, last visited on Mar. 3, 2008, one page.
Anonymous. (Date Unknown). "Google Earth User Guide" located at <http://earth.google.com/userguide/v4/>, last visited on Feb. 27, 2008, twelve pages.
Anonymous. (Date Unknown). "Google Earth—Wikipedia, the Free Encyclopedia," located at <http://en.wikipedia.org/wiki/Google_earth >, last visited on Mar. 3, 2008, fourteen pages.
Anonymous. (Date Unknown). "Google Earth User Guide—Using Image Overlays and 3D Models," located at <http://earth.google.com/userguide/v4/ug_imageoverlays.html >, nine pages.
Anonymous. (Date Unknown). "Google Maps," located at <http://en.wikipedia.org/wiki/Google_maps >, last visited on Feb. 27, 2008, eleven pages.
Anonymous. (Date Unknown). "Live Search Maps," located at <http://en.wikipedia.org/wiki/Windows_live_maps >, last visited on Mar. 3, 2008, six pages.
Anonymous. (Date Unknown). "WikiMapia," located at <http://en.wikipedia.org/wiki/WikiMapia >, last visited on Mar. 3, 2008, three pages.
Anonymous. (2007). "Ask.com Maps & Directions," located at <http://maps.ask.com/maps >, last visited on Mar. 3, 2008, one page.
Anonymous. (2007). "Wayfaring Follow You, Follow Me," located at <http://www.wayfaring.com/>, last visited on Mar. 3, 2008, three pages.
Anonymous. (2008). "Platial the People's Atlas," located at <www.platial.com >, last visited on Mar. 3, 2008, one page.
Anonymous. (2008). "Wikimpaia.org ," located at <http://wikimpaia.org/>, last visited on Mar. 3, 2008, one page.
Nedos, A; Singh K., Clarke S, Proximity Based Group Communications for Mobile Ad Hoc Networks; Proximity-Based Group Communication; Global Smart Spaces; D.14; Oct. 3, 2003; 31 pages.
Brunato, M; Battiti R. "Pilgrim: A Location Broker and Mobility-Aware Recommendation System"; Technical report DIT-02-0092, Universita di Trento, Oct. 2002; 8 pages.
Backstrom et al., Spatial Variation in Search Engine Queries, WWW•2008, Beijing, China (Apr. 21-25, 2008).
Gan et al., Analysis of Geographic Queries in a Search Engine Log, LocWeb 2008, Beijing, China (Apr. 22, 2008).
Jones et al., Geographic Intention and Modification in Web Search, International Journal of Geographical Information Science, vol. 22, No. 3, pp. 1-20 (Jul. 2008).
Sanderson et al., Analyzing Geographic Queries; Department of Information Studies; University of Sheffield, UK; 2 pages.
Go With the Flow, The Economist Technology Quarterly, vol. 382, Issue 8519, 4 pages, (Mar. 10, 2007).
International Search Report and Written Opinion (PCT/US2009/060476) dated May 4, 2010; 12 pages.
International Search Report and Written Opinion (PCT/US2009/060374) dated Apr. 30, 2010; 12 pages.
International Search Report (PCT/US2009/060379) dated Apr. 30, 2010; 3 pages.
International Search Report and Written Opinion (PCT/US2008/085135) dated May 25, 2009; 7 pages.
International Search Report (PCT/US2009/055503) dated Apr. 8, 2010; 3 pages.
Written Opinion (PCT/US2008/085915) dated Jun. 29, 2009; 4 pages.
Written Opinion (PCT/US2008/086948) dated May 21, 2009; 5 pages.
International Search Report and Written Opinion (PCT/US2009/051247) dated Jan. 25, 2010; 9 pages.
International Search Report and Written Opinion (PCT/US2009/046258) dated Dec. 23, 2009; 7 pages.
Almieda, R.B. et al. "A Community-Aware Search Engine," WWW2004, New York., NY, May 17-22, 2004, pp. 413-421.
Anonymous. (Jul. 16, 2006). MyFantasyLeague Fantasy Football League Management—Features, located at <http://web.archive.org/web/20060716072900/www.myfantasyleague.com/features.htm >, last visited on Feb. 10, 2009, four pages.
Anonymous. (Jul. 17, 2006). "Fantasy Football Lineup Analyzer—Tips for Who to Start & Who to Bench each Week," located at http://web.archive.org/web/20060717163352 9/www.fantasyfootballstarters.com/lineupAnalyzer.jsp>, last visited on Feb. 10, 2009, one page.
Bharat, K. (Date Unknown). "SearchPad: Explicit Capture of Search Context to Support Web Search," located at <http://www9.org/w9cdrom/173/173.html >, last visited Aug. 1, 2007, 13 pages.
Budzik, J. et al. (2000). "User Interactions with Everyday Applications as Context for Just-in-Time Information Access," Proceeding of the 2000 Conference on Intelligent User Interfaces, eight pages.
Finkelstein, L. et al. (2001). "Placing Search in Context: the Concept Revisited," WWW/O, Hong Kong, May 2-5, 2001, pp. 406-414.
Freyne, J. et al. (2004). "Further Experiments on Collaborative Ranking in Community-Based Web Search," Artificial Intelligence Review, pp. 1-23.
Lieberman, H. (1995) "Letizia: An Agent that Assists Web Browsing," Proceedings of the Fourteenth International Joint Conference on Artificial Intelligence, Aug. 20-25, 1995, six pages.
Mitra, M. et al. (1998). "Improving Automatic Query Expansion," Proceedings of the AMC SIGIR, nine pages.

(56) References Cited

OTHER PUBLICATIONS

Rhodes, B.J. et al. (1996). "Remembrance Agent: a Continuously Running Automated Information Retrieval System," Proceedings of the First International Conference on the Practical Application of Intelligent Agents and Multi Agent Technology (PAAM), pp. 487-495, located at <http://www.cc.gatech.edu/fac/Thad.Starner/p/032_40_agents&ubicomp/remembrance-agent . . . >, last visited Aug. 1, 2007, six pages.

Sansbury, C. (Sep. 13, 2005). "Yahoo! Widget for BBC Sports News—Scotland," 32. located at <http://widgets.yahoo.com/gallery/view.php?widget=37220 >, last visited on Feb. 7, 2007, one page.

Yahoo! Inc. (Dec. 7, 2005). "Yahoo! Widget Engine 3.0 Reference Manual Version 3.0," 300 pages.

U.S. Appl. No. 12/407,690, filed Mar. 19, 2009; 50 pages.

U.S. Appl. No. 12/407,681, filed Mar. 19, 2009; 56 pages.

International Search Report PCT/US2008/088228 dated Sep. 30, 2009—2 pages.

Written Opinion PCT/US2008/088228 dated Sep. 30, 2009—5 pages.

\* cited by examiner

SYSTEM AND METHOD FOR VERIFIED MONETIZATION OF COMMERCIAL CAMPAIGNS

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD OF THE INVENTION

The present invention relates to systems and methods for monetizing commercial campaigns which require the tracking the location of users and devices and, more particularly, to such systems and methods where the location of users and devices is verified using multiple sensors and other sources of location data.

BACKGROUND OF THE INVENTION

Commercial campaigns, such as advertising and incentive campaigns can include various monetization conditions wherein publishers and other service providers supporting the campaigns are paid fees or consumers are paid incentives on the occurrence of certain events. For example, one common category of fees are based on monetization conditions including events representing user interactions with websites, such as, for example, cost-per-click (CPC) fees or cost-per-impression (CPM) fees. Another category of fees are cost-per-action fees which can be based on monetization conditions based on the performance of specific actions by users in the real world. Certain types of actions can be detected by analyzing a user's location and association data. For example, a given pattern of locations over a specific time interval may be good evidence a consumer went to an automobile dealer and test drove a car, and with whom they went is valuable information to advertisers. Advertisers may, however, demand user's location data be known with a high level of reliability.

SUMMARY OF THE INVENTION

In one embodiment, the invention is a method. A definition of a commercial campaign is received, over a network, wherein the definition comprises an identification of an advertiser, an identification of an advertisement, at least one trigger condition, at least one monetization condition, at least one verification policy, and at least one monetization action, wherein trigger conditions relate to the occurrence of at least one trigger event, the monetization conditions relate to location data relating to at least one person, verification policies relates to the reliability of the location data relating to the persons, and the monetization actions relates to payments to payees. An indication of an association between a user and the advertisement is received, over the network. The user is associated with the commercial campaign using a first computing device. The occurrence of trigger events are detected using a second computing device. It is then determined, using a third computing device, that the at least one monetization condition and the at least one verification policy have been satisfied, wherein the at least one person is the user. The payees are then paid, using a fourth computing device, according to the monetization actions associated with the campaign. The first, second, third and fourth computing devices are each implemented using at least one processor.

In one embodiment, the invention is a system comprising a group of managers. Each of the managers comprises one or more processors programmed to execute software code retrieved from a computer readable storage medium storing software for specific functions. The managers comprise a campaign definition manager for receiving, over a network, definitions of commercial campaigns, wherein each definition comprises an identification of an advertiser, an identification of an advertisement, at least one trigger condition, at least one monetization condition, at least one verification policy, and at least one monetization action, wherein the at least one trigger condition relates to the occurrence of at least one trigger event, the at least one monetization condition relates to location data relating to at least one person, the at least one verification policy relates to the reliability of the location data relating to the at least one person, and the at least one monetization action relates to a payments to at least one payee; a user association manager for receiving, over the network, indications associations between users and advertisements and associating users with commercial campaigns associated with the respective advertisements; a campaign tracking manager for determining when monetization conditions and verification policies have been satisfied within commercial campaigns for persons associated with the respective commercial campaigns; and a monetization manager for paying payees associated with campaigns whose monetization conditions and verification policies have been satisfied according to the monetization action of the respective campaigns.

BRIEF DESCRIPTION OF THE DRAWINGS

The foregoing and other objects, features, and advantages of the invention will be apparent from the following more particular description of preferred embodiments as illustrated in the accompanying drawings, in which reference characters refer to the same parts throughout the various views. The drawings are not necessarily to scale, emphasis instead being placed upon illustrating principles of the invention.

DETAILED DESCRIPTION

Figure 1:
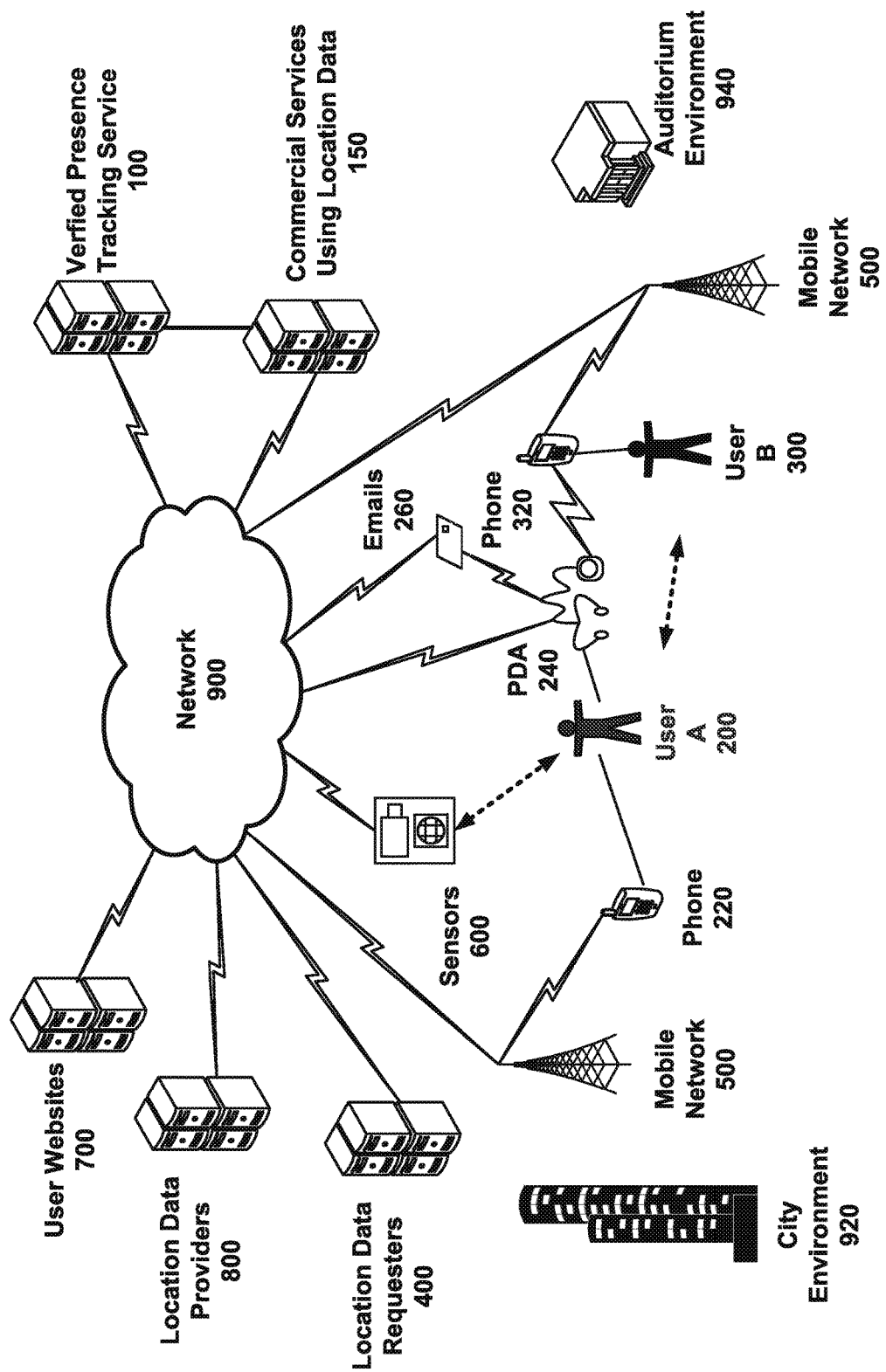
FIG. 1 illustrates one embodiment of communications and sensor networks that could be used to support at least one embodiment of the present invention.

The present invention is described below with reference to block diagrams and operational illustrations of methods and devices to select and present media related to a specific topic. It is understood that each block of the block diagrams or operational illustrations, and combinations of blocks in the block diagrams or operational illustrations, can be implemented by means of analog or digital hardware and computer program instructions.

These computer program instructions can be provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks.

In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure the term "server" should be understood to refer to a service point which provides processing, database, and/or communication facilities. By way of example, and not limitation, the term "server" can refer to a single, physical processor with associated communications and data storage and database facilities, or it can refer to a networked or clustered complex of processors and/or associated network and storage devices, as well as operating software and one or more database systems and applications software which support the services provided by the server.

For the purposes of this disclosure, a computer readable medium stores computer data in machine readable form. By way of example, and not limitation, a computer readable medium can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid-state memory technology, CD-ROM, DVD, or other optical storage, magnetic cassettes, magnetic tape, magnetic disk storage or other mass storage devices, or any other medium which can be used to store the desired information and which can be accessed by the computer.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium. Modules may be integral to one or more servers, or be loaded and executed by one or more servers. One or more modules may grouped into an engine or an application or a manager.

In one embodiment, the present invention includes to a commercial campaign system including a verified presence tracking system that tracks the locations of users using multiple sources for location data. Such sources can include various types of sensors, data supplied by other users and third party location data providers. Using a variety of sensor and user inputs, the verified presence tracking system can track users' locations with varying degrees of confidence, scoring available corroborative data by source and reliability and, when necessary, authenticating the presence of one or more users at a location by seeking additional corroborating sensors to actively verify and certifying both user identity and user location/proximity data.

FIG. 1 illustrates one embodiment of communications and sensor networks that could be used to support at least one embodiment of the present invention.

A verified presence tracking service 100 is hosted on at least one server. The server is connected to at least one network 900 through which the verified presence tracking service can receive location and location verification data as well as location data requests regarding a plurality of users, such as User A 200 and User B 300. In one embodiment, the network 900 includes connectivity to the Internet, and can additionally include connectivity to one or mobile networks 500 and one or more wireless or wireline sensor networks 600. Sensor networks may be physically or logically organized into networks across various telecommunications or communication networks.

In one embodiment, the verified presence tracking service 100 is configured to receive location data requests from one or more location data requesters 400. Such location data requesters 400 could be individual users such as User A 200 and User B 300. Such location data requesters 400 could be organizations, such as retailers and service providers that use location data for commercial purposes, such as promotion verification. Such location data requesters 400 could be government entities, such as law enforcement agencies that use location data for law enforcement purposes, such as locating a missing person or tracking a fugitive. Location data requests can be submitted using any conventional technique capable of transmitting data over the Internet. In one embodiment, location requests can be submitted though a web enabled interface, such as an HTML page. In one embodiment, location requests can be submitted via software running on a user device using an API.

In one embodiment, various commercial services 150 which use verified location data 150 could be integrated with the verified presence tracking service 100 to provide enhanced services. One such service could be a commercial campaign service that provides services that allow advertisers to define commercial campaigns (such as cost per action advertising or promotional campaigns) which require verified location data for one or more users. In one embodiment, the commercial services 150 are provided by the same service provider that provides verified presence tracking services 100. In another embodiment, the commercial services 150 may simply be another type of location data requester 400. In one embodiment, commercial services using location data 150 could be integrated with the verified presence tracking services 100 on the same server or cluster of servers.

The data relating to the location of User A 200 and User B 300 can be obtained from a variety of sources including humans and devices such as cellular telephones, mobile computing or gaming devices, appliances or vending machines, private or public vehicles, private or public buildings and sensors. Location data could be a stated location by the user or the user's device. In the illustrated example, user A 200 may engage in various online activities 700 that can provide location data. For example, user A 200 belong to one or more user websites such as a social networking website (such as the Facebook website) or a microblogging site (such as the Twitter website.), personal blogs or websites may also contain content created or annotated by the user and published on an interconnected network for consumption and enjoyment by other users. The user's online activities 700 such as what web sites are visited, how long they are visited for, and what is clicked on or interacted with a pointing device such as a mouse or cursor may also be traced and stored by the user, a network or third-party service provider. User A 200 may explicitly post a status message to such sites indicating his or her current location or an intended destination or series of locations and associated times of expected presence (which could be remote in time.) User A may also send emails indicating the user's current location or intended destination as well as communicated interactively through speech or IM in real-time with other users such that all of these channels may be sources of data regarding user location or destination including weighting the reliability of specific data instances or values based upon entity extraction from communications before, during or after the location/time data seeking to be verified. The verified presence tracking service 100 could also provide means to allow a user to directly post a stated location for the service to use via, for example, a webpage or a text message.

Location data could be obtained from communications networks. In the illustrated example, User A 200 and User B 300 both have phones 220 and 320 connected to a mobile network such as a CDMA or GSM network. User A's Personal Data Assistant PDA 240 may also be connected to a wireless network The position of the user's devices 220, 240 and 320 could be determined or approximated using any conventional technique such as triangulation of cell signals or the location of the nearest cell tower. The user's devices 220, 240 and 320 could also include other sensors, such as GPS sensors which could provide a relatively precise geographical position as well as biometric or orientation-in-space data. Successive sets of data could be analyzed to determine a real-time rate and direction for any motion as well as to establish individual, archetype user and aggregated user patterns and trends, which becomes valuable data in weighting the reliability of future location data instances.

Location data could be obtained from sensor networks. In the illustrated example, User A 200 is within the sensing radius of one or more sensor 600. The sensors 600 could be any kind of sensor capable of identifying an individual with a reasonable degree of accuracy including but not limited to RFID tag readers, biometric sensors, motion sensors, temperature or weather sensors, access sensors, security sensors or multimedia stream sources including real-time feeds from on scene users with multimedia streaming or capture enabled devices, appliances, vehicles, buildings, etc. For example, the sensors 600 could be any kind of biometric sensors such as a facial recognition system or a fingerprint scanner. The sensors 600 could be scanning devices for user identification credentials, such as a drivers license. The sensors could be RFID sensors that sense RFID devices associated with a user through, for example, a user device such as a PDA 240 in which an RFID device is embedded. Other known RFID-imbedded devices include people, clothing, vehicles, jewelry and child or elderly protection or monitoring devices.

Location data for one user could be provided by another user. For example, A 200 user could similarly provide a stated location for another user. For example, User A 200 could post a status message to a website or send an email that indicates User B 300 is, or will be, in a specific place at a specific time. One user's device could recognize the presence of another user's device in a given location. For example, User A's PDA 240, could use a short range communication protocol such as the Bluetooth protocol, recognize that User B's phone 320 is within range of the PDA and transmit such information to the verified presence tracking service 100 through one or more networks 900. A user device could be used to request a user to explicitly verify the presence of another user in a given location. For example, the verified presence tracking service 100 could send an inquiry to User A 200 via a text message, an email or an instant messages requesting User A to verify that User B 300 is in a given location or co-present with one or more additionally specified users or objects.

Location data could also be provided through one or more third party location data providers 800. This may be necessary under circumstances where location data cannot be directly obtained from a communications or sensor network, such as foreign jurisdictions which strictly control location data for privacy or national security reasons. It may also be from local area sensor networks such as video feeds, local wifi or other presence or identity enabled processes, appliances or devices that sense and record users and/or their activities at one or more locations. For example, a theme park or access-controlled home owners association gather data on users and their locations, their comings and goings which may be offered in real-time or post-event to others on a free or fee-basis.

Thus location data can be obtained through a variety of sources. Such data may vary, however, widely in reliability and granularity. The reliability and granularity affect the uses to which location can be put. Some applications may have relatively permissive requirements. For example, if a user is curious as to where his or her friends are currently located or where they have traveled recently, it may be sufficient to know they are in, or have traveled through specific states, countries or cities, and it may not be particularly important if a significant portion of the data is inaccurate. By definition, a less granular picture of user location or path data has a lower reliability threshold, whereas a highly granular location or path request has a higher reliability based upon actual number of available sources of verifying location data corroboration data. Also, if location data is used for commercial purposes, such as confirming that a user went for a test drive at a particular car dealership or dined at a specific restaurant to satisfy the terms of an online coupon, location data needs to be very reliable and detailed enough to satisfy the requirements of the specific application. If location data is used for security purposes, such as locating a missing user, it must be of the highest possible reliability.

The reliability of location data depends broadly on the sources of the information and the circumstances under which the data is collected. One conceptual model for reliability of location data of a user could be stated as follows.

$$R_1 = C_L(P_1 S_1)$$

Where $R_1$ is the reliability of location data relating to User 1, $C_L$ is the reliability of the context in which the data is collected, $P_1$ is the reliability of User 1 supplying location data $S1$ is the reliability of the sensor associated with User 1 supplying location data The term "context" should be understood to refer broadly to the total set of circumstances under which location data is obtained. It includes, without limitation, the physical location of the user and the sensor, the date and time the data is obtained, environmental factors, such as weather, co-presence of other users, devices or sensors/networks, metadata associated with any and all of those as well as data forecasting the activities the user is engaged in, such as watching concerts, attending school, shopping, and so forth. As stated above, entity extraction from communications and analysis off individual and system-wide user locations and sensor value correlation enable a rich ability to model any form of activity for which data can be sensed.

For the purposes of this application, where the term "reliability" is used, it is understood that unless otherwise qualified, it refers to the reliability of a user, sensor, place, time and so forth as a source of location data. It is not intended to imply that a user, sensor, place is reliable or unreliable in any other, or broader sense.

The conceptual model above expresses the general principal that when location data regarding a specific user is obtained, the reliability is affected by a combination of the reliability of the user as a source of information, the reliability of the sensor from which location data is received and the reliability of the context under which the location data is obtained. If any one of the three is unreliable, location data may be suspect.

In one embodiment, reliability of a given user, sensor or context may be determined on a typological basis, on an empirical basis or both. A user may be assigned to one or more types or archetypes based on any number of factors that describe the user. Such factors may include demographic factors such as age, nationality, gender, income, wealth, educational level and profession. Such factors may include the user's interests such as a favorite type of music, literature, hobby or other activities. Such factors may include metrics about the user's behavior on the Internet, such as the number of social networking websites the user is a member of, the number and frequency status messages posted by the user, the number of emails sent by a user, original content or content annotations published by the user, and so forth.

As a verified presence tracking service accumulates data, it may become obvious that certain types of users and/or devices are reliable sources of location data. For example, users between the age of 25-35 with graduate degrees who post status messages to social networking or microblogging services 10 times per day may be more reliable sources of location data because their regular supplying of explicit location data provides a more reliable path through space time of their actual locations than users who provide or create less explicit location data. On the other hand, users over the age of 55 who rarely or never send emails, instant messages or post status messages may be less reliable sources of information. In all cases, a users co-location with a device such as a cellular telephone or computing device that has a passive sensing capability enables a means to track their location implicitly without any need for status or location updates explicitly from the user.

When a user first becomes known to a verified presence tracking service, the user could be assigned a default reliability, or, alternatively, could be typed by one or more factors associated with that user and assigned an initial reliability based on such a type. For example, users who regularly shut off their devices or who have a history of post-event editing of their location data may be given a lower reliability score based upon their explicit attention to passive location data being gathered on them and/or an established pattern of falsifying or editing passively gathered location data. Reliability may also relate to the number and sophistication of sources. For example, a user with three co-present mobile devices gathering passive location data is far more reliable than a user with only one such device. Uses with GPS-enabled devices are more reliable than those with only cell-tower level location granularity.

After sufficient amount of verified presence data is accumulated regarding a user, it may be possible to determine the reliability of a user as a source of location data empirically, which is to say, on the basis of data alone. Thus, for example, a user who is typologically within a group that is generally considered to be reliable, may be found to be unreliable. For example, a user between the age of 25-35 with a graduate degrees who posts status messages to social networking or microblogging services 10 times may habitually post misinformation regarding his or her location or lend his or her mobile devices to other users.

A sensor may be assigned to one or types based on any number of factors that describe the sensor. Such factors may include basic types of technology, such as GPS sensors, RFID sensors, short range wireless sensors using protocols such as the Bluetooth protocol, or biometric sensors. Such factors may include the sensor's brand, or model number, or whether the device is running trusted client software or untrusted client software. When a sensor first becomes known to a verified presence tracking service, the sensor could be assigned a default reliability, or, alternatively, could be typed by one or more factors associated with that sensor and assigned an initial reliability based on such a type.

After sufficient amount of verified presence data is accumulated regarding a specific sensor, it may be possible to determine the reliability of the sensor as a source of location data empirically. Thus, for example, a sensor that is typologically within a group that is generally considered to be reliable may be found to be unreliable. For example, a GPS sensor may be considered to be generally reliable, but a given user's device may contain a GPS sensor that is defective or whose operation is impaired by the device in which it is embedded.

A context may be assigned to one or more types based on any number of factors that describe the context. Such factors may include a general description of the surroundings, such as, for such types could include example characterizations of the environment based upon density or number of sources of data, e.g. rural, suburban and urban environments. Within a given environment, there may further degrees of differentiation, such as residential, commercial, urban canyon, and highway environments including and up to exact location data. Such factors may include a type of building or location, such as, for example, shopping mall, auditorium, bar or club, office building or hospital environments. Such factors could include other environmental factors, such as co-present users or devices, weather and so forth, A context may also be assigned to types using temporal factors, which could include, without limitation, a specific time of day, a general day division such as morning, afternoon and evening, a day of the week, a season of the year, a specific holiday, and so forth. A context may be assigned to types based on activities a user is engaged in which could include, without limitation, a concert, a sporting event, a class, dining, work or vacationing and so forth.

As a verified presence tracking service accumulates data, it may become obvious that certain types of contexts are more or less reliable sources of location data. For example, a context such as a user at work in a suburban environment on Wednesday afternoon may be a relatively reliable context. A context such as an urban canyon at rush hour on Friday in bad weather may be less reliable. A context such as a concert on a Saturday night may be even less reliable.

It is worth noting that the reliability of a user, sensor or context may exhibit temporal patterns of reliability. For example, a context relating to an urban canyon may be unreliable between 7 and 10 AM on weekdays, relatively reliable between 10 AM and 4 PM, unreliable between 5 and 7 PM on weekdays and very reliable on weekends. Such temporal patterns of reliability could be used to empirically type a user, sensor or context that has not been typed.

For example, suppose a given location, such as building, street, block or neighborhood is known to be within a city, but nothing else is known. If the reliability of location data is found to be unreliable between 7 and 10 PM and reliable between 10 AM and 4 PM on weekdays, it could be inferred that the location is in an urban canyon context. This can valuable if, for example, there is little data regarding the reliability of location data obtained from the area on weekends.

This example also demonstrates how reliability of a user, sensor or context could be determined using a combination of typological and empirical reliability where the reliability of the user, sensor or context varies temporally. In one embodiment, if sufficient data can be obtained to determine reliability of a given user, place or context during specific time periods, actual data will be the preferred method of determining reliability of the user, place or context, but during time periods having little or no actual data, reliability could be determined typologically.

As discussed above, types of contexts can exhibit significant temporal variations in reliability. Types of user and sensors may, however, also exhibit significant temporal variations in reliability. For example, mobile devices which utilize a mobile network that is prone to instability during peak load hours may exhibit significant temporal variations in reliability regardless of location. A user between the ages of 21-25 may become unreliable sources of information on Friday night after 8:00 PM regardless of location.

Location data relating to a user can, in certain cases, be obtained from a second user. For example, suppose a first and second user are at the same location. Suppose both devices support a short range wireless protocol such as Bluetooth. Suppose further that the second user's mobile device has a GPS sensor. The Bluetooth protocol sensor of the second user's mobile device could detect the presence of the first user's mobile device. The second user's mobile device could then associate the first user with the location provided by the GPS sensor of the device. Alternatively, or additionally, the second user could post a status message to a social networking site indicating the first user is in a specific location.

In such a case, one embodiment of a conceptual model for the reliability of location data could be stated as $$R_1 = C_L(P_1 S_1 \rightarrow P_2 S_2)$$

Where $R_1$ is the reliability of location data relating to User 1, $C_L$ is the reliability of the context in which the data is collected, $P_1$ is the reliability of User 1 supplying location data S1 is the reliability of the sensor associated with User 1 supplying location data $P_2$ is the reliability of User 1 supplying location data $S_2$ is the reliability of the sensor associated with User 1 supplying location data Thus, the reliability of location data obtained from a second user regarding a first user can be a function of the reliability of both users and both sensors, as well as the context in which location data is obtained. This particular type of situation is noteworthy because location data obtained regarding a very unreliable source may be more reliable if it is obtained via a very reliable source.

The reliability of location data, in general can be verified in variety of ways. Three general categories of methods of verification are corroboration, currency and consistency.

Location data is corroborated when essentially the same data is obtained regarding a location at a specific time from multiple sensors. Thus, for example, a user may have a cellular phone, a second mobile device having a GPS and may frequently post status messages to a microblogging site. Location data could be obtained from all three sources and compared. If all three sources agree more than some fixed percentage of the time, for example, 95%, location data from all three sources could be considered very reliable. If on the other hand, status messages rarely agree with GPS and cellular location data, then status messages could be considered unreliable, but if GPS and cellular location data are relatively similar, they may still be considered reliable sources of location data. If no source agree with one another, they could all be considered unreliable sources of location data.

Corroborating location data from reliable sources which are not under the control a user are an especially valuable source of corroboration. For example, if a user is identified in a public location by a public biometric sensor, it is strong, if not definitive, corroboration or refutation of location data obtained from the user's GPS device that places the user in the same location or a different location respectively. In another example, if a first user's mobile device is detected by a second user's mobile device, and the second user's mobile device has a reliable GPS device, location data from the second user's mobile device that places the first user in the same location as data from the first user's mobile device strongly corroborates the location data from the first user's device. Social status messages posted by a first user that places a second user in a location that agrees with location data obtained from sensors associated with a second user corroborates such data.

In the case of location data collected from a sensor in a user device, the data can be further corroborated if there is evidence that the user was actually with his sensing device at the time the location data was collected. For example, a user recently authenticating (e.g. providing login credentials) via his sensing device provides evidence that the user was actually with his device and can temporarily increase the confidence score for location data provided by that device. A user device that collects a user voice print when making a phone call at or near the time location data was collected can be corroborating data.

The reliability of location data can also be explicitly corroborated by a third party. In one embodiment, the reliability of the retrieved location data is based upon the certification of a sensor by a trusted source. In one embodiment, the reliability of the retrieved location data is based upon the certification of data obtained from a sensor by a trusted source.

The reliability of location data can be inferred from currency. Time elapsed between sensor input and a presence request will generally decrease confidence in a location. For example, a GPS upload from 7:30 PM will provide more evidence that a user was at a given location at 7:35 PM than will a GPS reading from 8:00 PM. Time between sensor data acquisition and data upload will also decrease confidence (increasing the likelihood of tampering with the data. For example, a GPS reading that was uploaded immediately is more likely to be reliable than a reading contained in a GPS log that was uploaded a week after the fact. In another example, a social status message recorded on Tuesday that identifies the location of a user the previous Saturday may be suspect.

The reliability of location data can be inferred from consistency. In one embodiment, Location data can be considered to be consistent if, on the whole, it exhibits temporal patterns of variation that are within expected patterns of behavior. Data that lays outside of such patterns of behavior may be considered as unreliable. For example, suppose a user typically commutes between San Jose and San Francisco most weekdays. If a user's location data places the user in San Francisco on Monday and Wednesday, and in the Philippines on Tuesday, the user's location data relating to the Philippines is suspect.

Note that the reliability of location data may vary by granularity of the location information. For example, location data based on the nearest cell tower to a cell phone may be extremely reliable as a source of data indicating the position of a user's cell phone at the level of a state or city, but be very unreliable in locating the street or building a user is in.

In one embodiment, a verified presence tracking system can continuously track and store location data relating to a large number of users and sensors and associate such data with one or more contexts having one or more context properties. Such data can be continuously analyzed to determine the reliability of users, sensors and contexts, both on an individual and typological level. Over time the presence tracking system will learn reliability scores for various sensors.

Those sensors that frequently provide data consistent with other sensors will be considered more reliable (leading to higher confidence scores associated with readings from those devices) while sensors that provide inconsistent results will have their reliability reduced. The notion of reliability can be propagated through users as well. Data from a user who owns a sensor that provides bad data will initially have low confidence while a new device from a reliable user will initially have higher reliability scores.

In one embodiment, a verified presence tracking service could collect additional data regarding users in additional to spatial and temporal data. For example, the service could collect social and topical data relating to users. For example, the system could mine social networking sites or user blogs to identify a given user's friends, profession, interests and hobbies. In one embodiment, the lives of users can be instrumented and referencing and cross-referencing data associated among users known to the system can be used to create and maintain a global presence graph that has the path and last known/current location in real-space mapped together relative for all known users. Within a global presence graph, a location can be a physical geographic coordinates or labels applied to bounded areas of space, but since this graph can also link to all related data, users can also be located in many virtual locations based upon online resources and/or topics/content sub-categories.

In one embodiment, a global presence graph can be used to compute actual and relative distances between users and location-reporting sensors. For example, a coffee shop with ten patrons may include 8 with 12 devices that are known to a verified presence tracking service, so its global graph maps these users, devices and sensors as co-present within a bounded physical location. A similar number of people may occupy a similar density at another location and not represent a bounded set, e.g. at a park where a large concert or festival is ongoing. A global presence graph can be used for scoring the reliability of location data based upon the availability or non-availability of a corroborating data source, and the graph can be used as the basis for selection and ranking of potential verification sources.

A verified presence tracking service can thus provide a large collection of location data related to a large number of users. Such location data has myriad applications. One type of application is a real time location request. In one type of location request, a first user may request the current location of a second user. In another type of location request, a first user could request verification that a second user is currently in a particular location. Such a request could be preferred in some cases, since it is less intrusive. For example, a user may only be allowed to listen to a set of music tracks if he or she is in a particular business location, but the business does not need to know the user's actual location if the user is not currently in the business.

In one embodiment, location request can also request historical location data. For example, a first user may request the location of a second user at a particular time, or through one or more ranges of times. In another example, a first user could request verification that a second user was in a particular location at a specific time of range of times. In another example, a first user could request verification that a second user was in a series of locations, either in a particular time order, or randomly. In general, a historical location verification request could specify a pattern of locations, some of which could be optional or required, and which could specify exact times or time ranges.

In any of the above embodiments, such location requests could specify a granularity (e.g. city, street, building or business, or, alternatively, a one mile radius, a four block radius or a ten foot radius.) Such could also specify a confidence, such as, for example, at least 50% likely the location is correct, at least 90% the location is correct, or near certainty (within the limits of the system) the location is correct.

A user's current or historical location information is potentially sensitive. While some users may be indifferent as to whether their location data is known to the general public, many, if not most users would prefer to restrict access to their location data to a limited set of users. A location tracking service could, in theory, be based on publically available information, but is greatly enhanced if private or semiprivate data is gathered from user owned sensors and other sources. Such data may be very sensitive. In fact, a user may have serious safety concerns that they may be stalked or harassed by hostile individuals or organizations if their current and historical location data becomes publically available.

In one embodiment, a verified presence tracking service only tracks private or semiprivate location data for users who have explicitly become members of such a service. Such a service could, optionally, also include publically available location information for user and non-users of the service. In one embodiment, a verified presence tracking service can enable a user to set up preferences and access permissions that specify who should have access to the user's location data. Access rights can be set up as a white list or black list that specifies classes of other users, or individual users who are allowed or barred respectively from viewing another user's location data.

Access rights can define the granularity of location data that a user or class of users can access. For example, a user may allow all users to view the user's stated location, which as noted above, may or may not correspond to the users actual location. A user may allow coworkers or family members to determine what country, state or city the user is located in, but not an actual street or business. A user may allow close friends the user has defined to the verified presence tracking service to view the user's real time location, but not the user's location history. A user may allow a vendor to verify the user's location history to qualify the user for an online promotion, but prohibit the vendor from view any location data related to the user.

In one embodiment, a location request input to a verified presence tracking system can be given access to a user's location history based on a multifactor rating given to the request based on source and purpose. Such a rating can be based on the source of the request and the purpose of the request. For example, requests from spouses or family members can be rated higher than from friends, which can be rated higher than acquaintances, which can in turn be rated higher than from total strangers. Degrees of relationship between the users and acquaintances or strangers may also allow the useful classification and rating of sub-groups of users based upon the frequency, duration, number and quality of contacts or data associations between the requestor and the subject of the request.

The purpose of a request may or may not be stated, so a default non-modified purpose can be assumed, while a user can create a list of prioritized purposes, processes or users whose requests are rated highly. For example, requests defined as "urgent" or "emergency" could be rated higher that requests defined as "work related" which could be rated higher that requests defined as "social contact" which could in turn be rated higher that "promotion verification."

The rating of a request can in turn define whether the request is processed or rejected. For example, an "emergency" request from a family member would likely be processed, whereas a "social contact" request from a stranger or acquaintance might be rejected. In one embodiment, the rating of a request could determine the granularity of location data made available to a requester. For example, a high rated request could be allowed to provide location data that can locate a user within a building or a small physical radius, such as 50 feet. A low rated request might only be given location data at a country, state or city level, or may only have access to a user's stated location.

Figure 2:
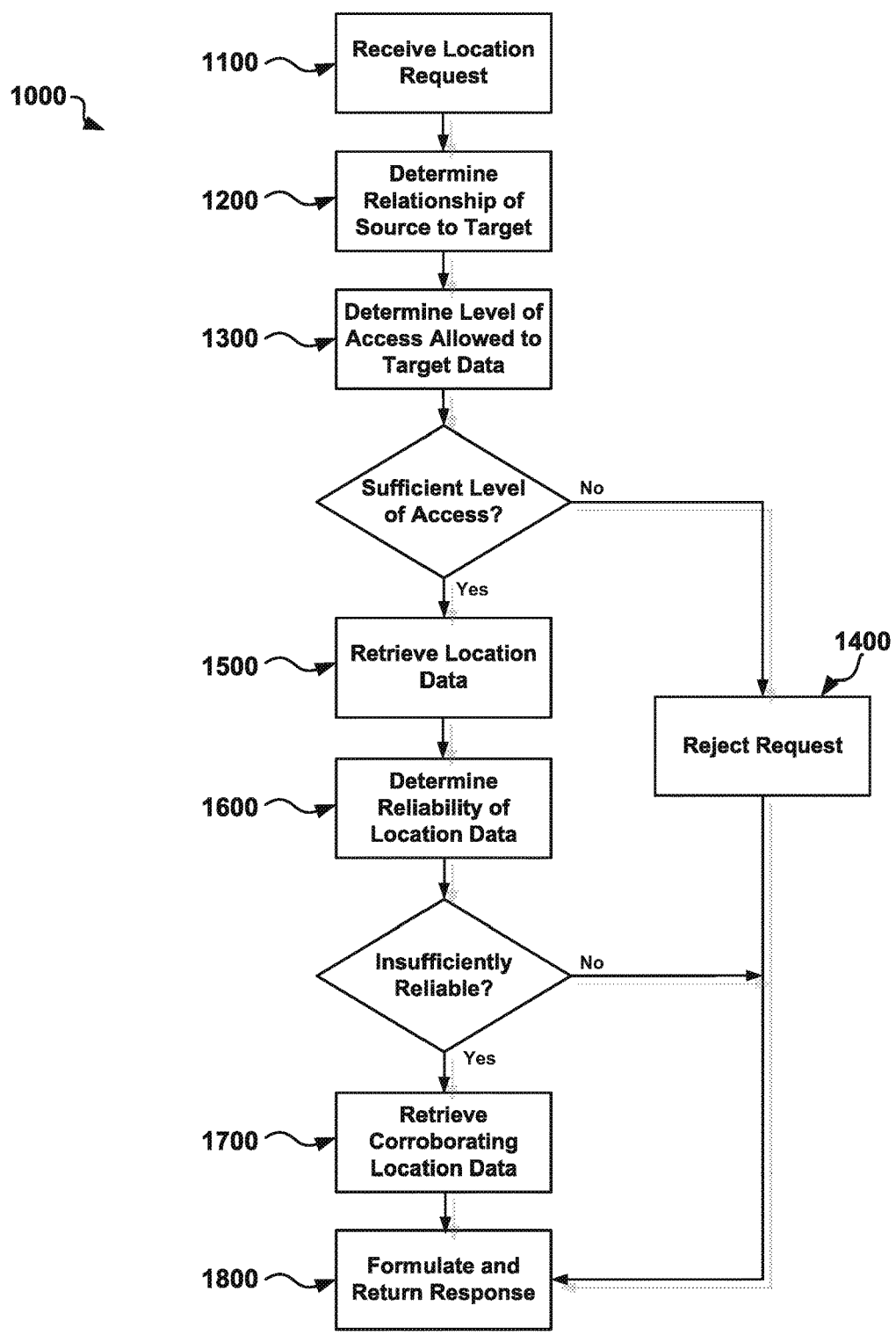
FIG. 2 illustrates one embodiment of a process for verified presence tracking using at least one embodiment of the system disclosed herein.

FIG. 2 illustrates one embodiment of a process 1000 for verified presence tracking using at least one embodiment of the system disclosed herein.

A request for a location is received 1100, over a network, such as the Internet. The request may have been transmitted from a user, an organization or a system using any conventional methodology for transmitting information over a network, such as data entered through a web form, transmitted using a custom API, an email, or an instant message. In one embodiment, the request comprises a request type, a request source and a request target. In one embodiment, the request may additionally comprise one or more request parameters.

In one embodiment, the request types can include a request type for a target's location and a request type to verify a target's location. The request source could comprise an identification of an individual user (i.e. a user), an identification of a business entity, such as a product manufacturer or distributor, or an identification of any other type of entity having an interest in location data such as a law enforcement or security agency. The source could comprise an identification of another system, such as, for example, an advertising revenue system.

The request target could comprise an identification of an individual user (i.e. a user), although the target could be any kind of object or entity that can be associated with locational data. For example, such an entity could be a corporate resource used by many users, such as a company cell phone or laptop. Such an entity could be a group of individual users. The request target could also comprise an identification of a group of two or more individuals. Where the request type of a multiple target location request is a location request, the request is essentially equivalent to two or more separate location requests. Where the request type of a multiple target location request is a location verification request, all specified targets must satisfy the terms of the request The request parameters can include a variety of options depending on the request type, source and target. In the case of a request type to verify a target's location, the request parameter can include one or more spatial parameters that comprise an identification of a location or list of locations. The identification of the location could be in any format necessary to express the location at a level of granularity required by the request, such as a state, city, a building or a business location.

Request parameters can include one or more temporal parameters that specify a time or time range or a list of times or time ranges for a location request. A temporal request parameter could specify a real-time request, or a request for the most recent known location for a target. A temporal request parameter could specify a historical date and time, a range of historical dates and times or a list of such dates and times. A temporal request parameter could specify a time or date offset, a holiday or an event or any other data that can be resolved to an absolute date and time or date and time range.

In the case of a request type to verify a target's location where the request parameter include spatial parameters that comprise an identification of a list of locations, each location in the list of locations can be associated with one or more temporal request parameters. Note that a list of locations with times can, together, define a pattern of behavior that can be used for many purposes. For example, such a pattern could be used to verify a user's participation in a promotion. Such a pattern could also be used to identify abnormal patterns of behavior, e.g. a pattern that indicates a person may have been abducted.

In one embodiment a request to verify a target's location could includes at least one additional user where the purpose of the request is to verify that the target and the additional users are or were co-located. Such a request could additionally include at a specific location and time or a list of locations and times.

Request parameters can include one or more parameters that define the purpose of the request. In one embodiment, users can create list of prioritized purposes, processes or users whose requests are rated highly. For example, requests defined as "urgent" or "emergency" could be rated higher that requests defined as "work related" which could be rated higher that requests defined as "social contact" which could in turn be rated higher that "promotion verification."

Request parameters can include one or more parameters explicitly indicating the granularity required for the request. For example, the request could specify a parameter requesting location data at a country, state, city, street, a business or building or an exact GPS location. The granularity stated in the request could be a preferred granularity, or a required granularity. The granularity of the request may be implied based on other parameters. For example, an "emergency" request could imply the highest level of granularity available. The required granularity could be implied in a location verification request by the level of granularity of the requested location (e.g. state, city or building.)

Request parameters can include one or more parameters explicitly indicating the reliability of data required for the request. For example, the request could specify a parameter requesting location data that where there is a 90% confidence the data is correct. The reliability stated in the request could be a preferred reliability, or a required reliability. The reliability of the request may be implied based on other parameters. For example, an "emergency" request could imply the highest level of reliability available. The required reliability could be implied in a location verification request by the level of granularity of the requested location, where, for example, a request for data at a state or city level need not be retrieve location data that is as reliable as that needed for a request at a building level.

All request parameter could additionally be assigned default values if they are not explicitly entered. For example, a default temporal parameter could be the current date and time (i.e. real-time), a default purpose could be "inquiry." A default granularity could "best available" where the best available granularity reflects the most detailed data the source is allowed to access (and not necessarily the most detailed data available on the system.) A default reliability could be "best available" representing the most reliable data (which may not be very reliable in some cases) that is currently known to a location verification system.

The relationship of the request source to the request target is then determined 1200. In one embodiment, the source and the target are members of a verified presence tracking service and the relationship between the source and the target is known to the service. In one embodiment, the relationships between the target and the source could include, without limitation, "spouse", "parent", "child", "employer", "employee", "agent", "client", "self", "friend", "relative", "acquaintance", "coworker", "vendor" or "advertiser" or "sponsor." In one embodiment, users explicitly define their relationships with other users. In one embodiment, the relationships between users is automatically mapped by analyzing available data sources such as user emails, user BLOGs, user social network profiles and user status messages. In one embodiment, the relationship between the source and the target can be verified by the target before a request is processed. The relationship could be verified by the user in real-time via, for example, emails, instant messages or any other medium that can enable a user to respond to an inquiry. In one embodiment, the relationship between the source and the target can be automatically verified by a device associated with the target.

The level of access the source is allowed to the target's location data is then determined 1300. In one embodiment, the target has defined access privileges on a verified presence tracking services. In one embodiment, access privileges are defined for types of relationships such as "friend", "coworker" and "stranger", and can additionally be defined for specific users or groups of users. In one embodiment, access privileges specify the level of granularity of location data a user to which a user has access. In one embodiment, lists of users, groups of users or relationships could be placed on a whitelist that have defined access rights to a user's location data, and all other users have no access rights. In one embodiment, lists of users or groups of users could be placed on a blacklist such that such users are denied access rights or given reduced access rights even if the relationship of the source to the target would ordinarily imply access to the target's location data.

In one embodiment, requests could be rated using a multifactor rating given to the request based on source and purpose. For example, requests from spouses or family members can be rated higher than from friends, which can be rated higher than acquaintances, which can in turn be rated higher than from total strangers. Requests defined as "urgent" or "emergency" could be rated higher that requests defined as "work related" which could be rated higher that requests defined as "social contact" which could in turn be rated higher that "promotion verification."

In one embodiment, the rating of a request be used to determine whether a request is processed at all, and what granularity of location data the to which the source will be allowed access. For example, a high rated request could be allowed to provide location data that can locate a user within a building or a small physical radius, such as 50 feet. A low rated request might only be given location data at a country, state or city level, or may only have access to a user's stated location or may be allowed no access whatsoever to a target's location data.

In one embodiment, access privileges could be defined separately for location requests and location verification requests. As discussed above, a location verification request is potentially less intrusive than a location request, since if a target is not or was not at a specified location at a specified time, the source will not be given the target's location. In one embodiment, access privileges could be defined separately for real-time and historical location data requests. As discussed above, a real-time location request is potentially less intrusive than a historical location request since a real-time request only reveals a current location, whereas a historical request can provide a detailed plot of a user's activities over time.

If the source does not have sufficient access permission to access the target's location data at the request's required level of granularity, the request is rejected 1400. As discussed above, every request will be associated with an explicit, implied or default required granularity. Many requests may simply be for "best available" location data, which is the most detailed level of location data to which the source has access. If a specified granularity of a request is a preferred granularity and the source does not have access to location data for a target at that level of detail, the target receives can receive data at a "best available" level, and can thus be processed.

In at least one embodiment, steps 1200 through 1400 as described above are optional. In one embodiment, all users of the service are authorized to view location data for all other users. In one embodiment, a user of the service is only authorized to view location data for a target when the target expressly consents to allow the user to view the target's location data.

Location data related to the request is then retrieved 1500 from one or more location data sources. In one embodiment, location data is retrieved from one or more databases of location data maintained by a verified presence service that retrieves location data from sensor networks, communication networks and other location data sources. In one embodiment, the verified presence tracking service collects additional data regarding users in additional to spatial and temporal data and references and cross-references data associated among users known to the system to create a global presence graph that has the path and last known/current locations in real-space mapped together relative for all known users. In one embodiment, the global presence graph can be used to retrieve location data relating to a target.

Alternatively, in one embodiment, real-time location data could be retrieved from a network of sensors from sensor networks, communication networks and other location data sources in real-time. In one embodiment, real-time location data and data retrieved from one or more databases could be combined. In one embodiment, real-time and historical location data could be retrieved from a third-party location data source.

The reliability of the retrieved location data is then determined 1600. In one embodiment, for each location data point, the reliability of the users and the sensors involved in collecting the data is identified and the reliability of the context under which the data was collected is identified. In one embodiment, the reliability of users, sensors and contexts can be determined empirically or typologically, and may vary temporally.

In one embodiment, location data can be further evaluated for corroboration, consistency, and currency as discussed in detail above. In one embodiment, a global presence graph maintained by a verified presence tracking system can be used to identify corroborating data, evaluate the consistency of location data for users over time and determine the currency of location data.

In one embodiment, the reliability of location data is determined when a location request is received. In one embodiment, the reliability of location data collected and stored by a verified presence tracking system is continuously determined at or near the time the data is collected.

If the reliability of the location data is insufficient to satisfy the terms of the request, additional corroborating data is retrieved 1700.

In one embodiment, a verified presence tracking service may not continuously retrieve location data from all possible sources. This may be for a variety of reasons. For example, a given sensor, such as a biometric sensor, may not be able to continuously recognize every user that comes within range of the sensor. This may be because of, without limitation, processing limits inherent in the sensor or bandwidths limit within the network to which the sensor is connected. Certain corroborating data sources might have a high cost of data acquisition such as, for example, sources for data acquisition that requires the efforts of another user to collect.

In one embodiment, a verified presence tracking service acquires data from a hierarchy of sensors, where location data is continuously acquired from a first group of sensors that have a low cost of data acquisition, such as, for example, data automatically acquired directly from GPS sensors associated with a user device or mobile phone location data acquired from a mobile network. Where a location request requires a higher level of reliability than is provided by data collected from the first group of sensors, data may be acquired from one or sensors in a second group of sensors that are used for obtaining corroborating data.

Sensors within the second group could comprise fixed sensors, such as biometric sensors, cameras, microphones, RFID tracking sensors and so forth, that data from which data can be automatically acquired. Sensors within the second group could also comprise mobile sensors associated with a user known to the system. Such sensors could include, without limitation mobile devices carried by a user such as mobile phones, PDA, cameras, voice recorders, and so forth. Acquisition of data from mobile sensors could be entirely automatic. For example, if it is desired to verify the location of a first user who has a mobile phone that supports a short range wireless protocol, the location of the first user's mobile phone could be verified by requesting a second user's mobile phone that supports the same short range wireless protocol to attempt to locate the first user's mobile phone.

In some cases, acquisition of corroborating location data could involve steps requiring a user to take a specific action. For example, if a verified presence tracking service has reason to believe that a first user whose location is to be verified may be within the visual range of a second user, the service could send a message to a mobile device associated with the second user asking the second user if he or she can see the first user. Such a message could be communicated in any manner suited to the second user's mobile device, such as a text message or email to which the second user can reply. The verified presence tracking service could also request the second user to take some other action that would provide data suitable to verify the first user's location, such as taking a picture of the first user or taking a voice recording of or near the first user.

In one embodiment, a global presence graph maintained by a verified presence tracking services comprises the last known location of all users, sensors associated with such users, and the location of all fixed sensors known to the service. In one embodiment, a global presence graph can be used to compute actual and relative distances between users and location-reporting sensors. For example, a coffee shop with ten patrons may include 8 with 12 devices that are known to the service, so its global graph maps these users, devices and sensors as co-present within a bounded physical location.

In one embodiment, the verified presence service rates the reliability of all sensors known to the service. In one embodiment, when a verified presence tracking service is attempting to obtain corroborating data for the location of a user, the service can select one or more sensors based on the sensor's proximity to the location which is to be verified and the reliability of the sensor.

In one embodiment, if a first user or a first user's device supplies corroborating location data for a second user, the first user can be rewarded for consistent and reliable responses to such requests or reduced in reputation or reliability rating for failing to respond or for reports that later are proved likely to have been false (or fraudulent.) In some embodiments, verification sources may be monetarily compensated while in others received points, scoring, or increases to a reputation or reliability rating.

A response is then formulated and transmitted to the request source 1800. The content of the response will depend on the type of the request. A request for a location will return a description of a location. In one embodiment, the description of the location can be at the requested level of granularity if the source is permitted to view location data at that level of granularity and such data is available. If a source is not permitted to view data at that level of granularity, the location data description can provide a location description at the level of granularity the source is permitted to view. If location data is not available at the requested (or default) level of granularity, the location data can be provided at the best available level of granularity. The response can additionally include a reliability or confidence score for the location data. If more that more location is displayed, or if a location is displayed for a time range as a series of time slices, confidence or reliability scores can be displayed for each location or time slice.

A request to verify a location can return a simple "verified" or "not verified." Alternatively, more information can be provided such as "no information available" or "information indicates target was in another location." The verification message could also contain a confidence score that the target is or was in a location at a specific time.

Figure 3:
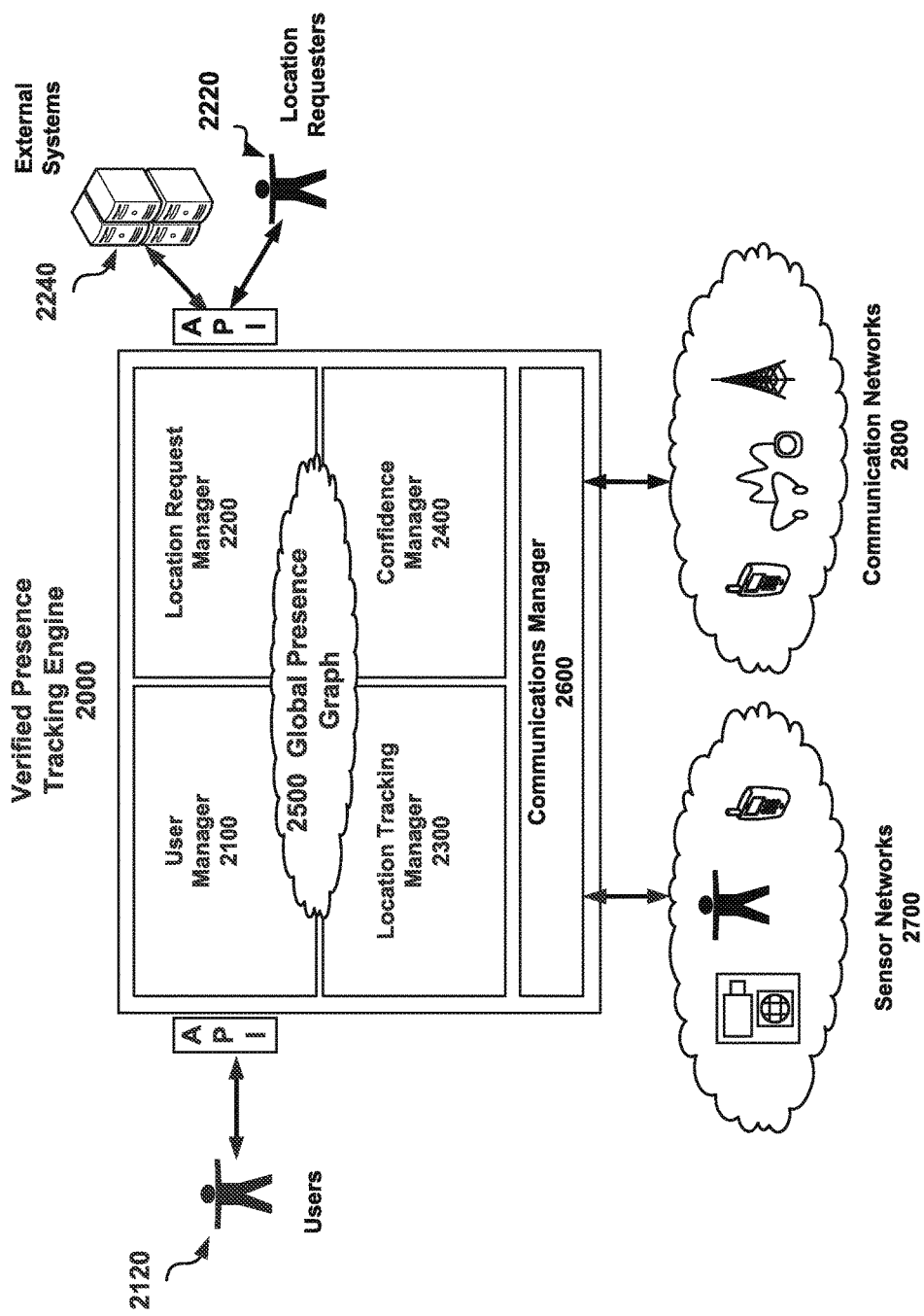
FIG. 3 illustrates one embodiment of a verified presence tracking engine capable of supporting at least one embodiment of the process described in FIG. 2.

FIG. 3 illustrates one embodiment of a verified presence tracking engine 2000 capable of supporting at least one embodiment of the process described in FIG. 2 above. In one embodiment, the verified presence tracking engine 2000 comprises a User Manager 2100, a Location Request Manager 2200, a Location Tracking Manager 2300. a Confidence Manager 2400 and a Communications Manager 2600. In one embodiment, the verified presence tracking engine 2000 is hosted on one or more servers hosted by a verified presence tracking service such as the service 100 shown in FIG. 1.

In one embodiment, each of the managers comprises one or more processors programmed to execute software code retrieved from a computer readable storage medium storing software for functions as described below. In one embodiment, each of the modules could be hosted on one or more servers hosted by a verified presence tracking service such as the service 100 shown in FIG. 1. Such an embodiment is purely exemplary, and all of the managers shown could be implemented in any combination on any number servers, as will be readily apparent to those skilled in the art.

In one embodiment, the User Manager 2100 provides facilities that enable users or other entities, such as business organizations, to become users 2120 of the system. The User Manager 2100 can allow users to set up user profiles that can include user demographic information and preferences, define user devices that can serve as sources of location data for the user, and third party websites, such as social networking sites and microblogging sites, that can serve as additional sources of data relating to the user and the user's location. In one embodiment, the User Manager 2100 can provide a web enabled interface to users, such as a website comprising one or more HTML pages. In one embodiment, the User Manager 2100 can provide an API that enables software running on user devices to access facilities provided by the User Manager.

In one embodiment, the User Manager 2100 can provide facilities that enable a user to define the user's contacts and the users relationships to such contacts. Such relationships could include categories such as "friend", "relative", "acquaintance", "coworker"," "vendor" or "advertiser." In one embodiment, the User Manager 2100 automatically identifies a user's contacts and categorizes the user's relationships with such contacts by analyzing available data sources such as user emails, user BLOGs, user social network profiles and user status messages.

In one embodiment, the User Manager 2100 can provide facilities that enable a user to define access privileges to the user's location data. Access privileges could be defined for the user's contacts individually, or could be defined by categories of relationships. In one embodiment, access privileges specify the level of granularity of location data a user to which a user has access.

In one embodiment, lists of users, groups of users or relationships could be placed on a whitelist that have defined access rights to a user's location data, and all other users have no access rights. In one embodiment, lists of users or groups of users could be placed on a blacklist such that such users are denied access rights or given reduced access rights even if the relationship of the source to the target would ordinarily imply access to the target's location data.

In one embodiment, access privileges could be defined separately for location requests and location verification requests. In one embodiment, access privileges could be defined separately for real-time and historical location data requests In one embodiment, the Location Request Manager 2200 can provide facilities to receive and respond to requests for location data and location verification from location requesters 2220 and external systems 2240 that have an interest in location data. In one embodiment, the Location Request Manager is configured to receive location requests comprising a request type, a request source, a request target and, optionally, one request or more request parameters. In one embodiment, the Location Request Manager 2200 can provide a web enabled interface to users, such as a website comprising one or more HTML pages. In one embodiment, the Location Request Manager 2200 can provide an API that enables software running on user devices to access facilities provided by the Location Request Manager.

In one embodiment, the request types can include a request type for a target's location and a request type to verify a target's location. The request source could comprise an identification of a individual user (i.e. a user), an identification of a business entity, such as a product manufacturer or distributor, or an identification of any other type of entity having an interest in location data such as a law enforcement or security agency. The source could comprise an identification of another system, such as, for example, an advertising revenue system.

The request target could comprise an identification of an individual user (i.e. a user), although the target could be any kind of object or entity that can be associated with locational data. For example, such an entity could be a corporate resource used by many users, such as a company cell phone or laptop. Such an entity could be a group of individual users. The request target could also comprise an identification of a group of two or more individuals. Where the request type of a multiple target location request is a location request, the request is essentially equivalent to two or more separate location requests. Where the request type of a multiple target location request is a location verification request, all specified targets must satisfy the terms of the request The request parameters can include a variety of options depending on the request type, source and target. Such parameters could include: spatial parameters that comprise an identification of a location or list of locations, temporal parameters that specify a time or time range or a list of times or time ranges, parameters that define the purpose of the request, parameters explicitly indicating the granularity required for the request and parameters explicitly indicating the reliability of data required for the request. Such parameters are discussed in detail above in the description of process step 1100. All request parameter could additionally be assigned default values if they are not explicitly entered.

In one embodiment, the Location Request Manager 2200 is further configured to determine, for each location request, the relationship between the source and the target using relationships defined and maintained by the target user using facilities provided by the User Manager 2100. Where no defined relationship exists, a default relationship such as "stranger" or "unknown" could be used.

In one embodiment, the Location Request Manager 2200 is further configured to determine the level of access a source is allowed to a target's location data using access privileges defined by the target user through facilities provided by the User Manager 2100. In one embodiment, requests could be rated using a multifactor rating given to the request based on source and purpose as discussed in detail above, and the level of access allowed to the source the level of access a source is allowed to a target's location data is determined using the rating. If the source of a location request does not have sufficient access authority to access the target's location data at the request's required level of granularity, the request the Location Request Manager 2200 rejects the request and can further send a rejection message to the request source.

In embodiment, if the source of a location request has sufficient access authority to access the target's location data at the request's required level of granularity, the Location Request Manager 2200 requests the target's location data from the Location Tracking Manager 2300 at a required level of reliability. In one embodiment, the Location Request Manager 2200 receives location data and location reliability data from the Location Tracking Manager 2300 relating to location tracking requests and formulates and transmits responses to such location tracking requests to the requesting sources.

The content of the response will depend on the type of the request. A request for a location will return a description of a location. In one embodiment, the description of the location can be at the requested level of granularity if the source is permitted to view location data at that level of granularity and such data is available. If a source is not permitted to view data at that level of granularity, the location data description can provide a location description at the level of granularity the source is permitted to view. If location data is not available at the requested (or default) level of granularity, the location data can be provided at the best available level of granularity. The response can additionally include a reliability or confidence score for the location data. If more than one location is displayed, or if a location is displayed for a time range as a series of time slices, confidence or reliability scores can be displayed for each location or time slice.

Location Request Manager 2200 can return a can return a simple "verified" or "not verified" response to a request to verify a location. Alternatively, more information can be provided such as "no information available" or "information indicates target was in another location." The verification message could also contain a confidence score that the target is or was in a location at a specific time.

In one embodiment, communications between the Location Request Manager 2200 and requesting users can be encrypted at an appropriate level of encryption based on the source and the targets security needs. In one embodiment, communications between the Location Request Manager 2200 and requesting users can be conducted on a secure channel.

In one embodiment, the Location Tracking Manager 2300 continuously or periodically retrieves location data relating to users registered through the User Manager 2100 from one or more location data sources using the facilities of the Communications Manager 2600. Such location sources sensor networks 2700, communication networks 2800 and other location data sources such as third party location data providers. In one embodiment, the Location Tracking Manager 2300 stores retrieved location data on one or more databases. In one embodiment, the verified presence tracking service collects additional data regarding users in addition to spatial and temporal data and references and cross-references data associated among users known to the system to create a global presence graph that has the path and last known/current locations in real-space mapped together relative for all known users.

In one embodiment, the Location Tracking Manager 2300 responds to requests from the Location Request Manager 2200 for location data relating to target users and returns the location data along with reliability scores for the data to the Location Request Manager 2200. In one embodiment, the Location Tracking Manager 2300 retrieves location data from one or more databases of location data maintained by the Location Tracking Manager 2300. In one embodiment, a global presence graph maintained by the Location Tracking Manager 2300 can be used to retrieve location data relating to a target.

Alternatively, in one embodiment, real-time location data could be retrieved in real-time from a network of sensors from sensor networks, communication networks and other location data sources using the facilities of the Communications Manager 2600. In one embodiment, real-time location data and data retrieved from one or more databases could be combined. In one embodiment, real-time and historical location data could be retrieved from a third-party location data source.

In one embodiment, the Location Tracking Manager 2300 requests reliability scores from the Confidence Manager 2400 for specific location data when it is responding to a request from the Location Request Manager 2200 for location data relating a target user. In one embodiment, the reliability of the location data retrieved by the Location Tracking Manager 2300 is continuously evaluated by the Confidence Manager 2400 and reliability scores can be stored in a database accessible to the Location Tracking Manager 2300 or the Confidence Manager 2400 or both. In one embodiment, reliability scores are stored along with location data in a global presence graph 2500 maintained by the Location Tracking Manager 2300.

In one embodiment, the Confidence Manager 2400 assigns reliability scores to data retrieved by the Location Tracking Manager 2300. In one embodiment, the Confidence Manager 2400 scores the reliability of data retrieved by the Location Tracking Manager 2300 only when specifically requested to do so by the Location Tracking Manager. In one embodiment, the reliability of the location data retrieved by the Location Tracking Manager 2300 is continuously evaluated by the Confidence Manager 2400 at or near the time the data is collected.

In one embodiment, the Confidence Manager 2400 determines the reliability of the users and the sensors involved in collecting location data and further determines the reliability of the context under which location data was collected. In one embodiment, the reliability of users, sensors and contexts can be determined empirically or typologically, and may vary temporally.

In one embodiment, the Confidence Manager 2400 can enable a system level user to manually define the reliability of types of users, types, and contexts where empirical reliability data is not available. Users, sensors and contexts representing types unknown to the Confidence Manager 2400 can be assigned a default reliability. In one embodiment, the Confidence Manager 2400 is configured to continuously or periodically evaluate the reliability of users, sensors and contexts and types of users, sensors and contexts using location data retrieved by the Location Tracking Manager 2300.

In one embodiment, Confidence Manager 2400 empirically determines the reliability of location data retrieved by the Location Tracking Manager 2300 by evaluating the data for corroboration, consistency, and currency as discussed in detail above. In one embodiment, a global presence graph maintained by a verified presence tracking system can be used to identify corroborating data, evaluate the consistency of location data for users over time and determine the currency of location data.

In one embodiment, when the Location Tracking Manager 2300 requests reliability scores from the Confidence Manager 2400 relating to location data, the Location Tracking Manager 2300 can additionally specify a preferred or required level of reliability for the data. If the Confidence Manager 2400 determines the reliability of the location data is insufficient to satisfy the terms of the request, Confidence Manager 2400 can attempts to retrieve additional corroborating data using facilities provided by the Communications Manager 2500.

In one embodiment, the Confidence Manager 2400 can attempt to retrieve, additional corroborating data from sources not normally used by the Location Tracking Manager 2300. Such sources could include fixed sensors, such as biometric sensors, cameras, microphones, RFID tracking sensors and so forth, that data from which data can be automatically acquired. Such sources could also include mobile sensors associated with a user known to the system. Such sensors could include, without limitation mobile devices carried by a user such as mobile phones, PDA, cameras, voice recorders, and so forth.

The Confidence Manager 2400 could acquire data from mobile sensors automatically. For example, if it is desired to verify the location of a first user who has a mobile phone that supports a short range wireless protocol, the location of the first user's mobile phone could be verified by requesting a second user's mobile phone that supports the same short range wireless protocol to attempt to locate the first user's mobile phone.

The Confidence Manager 2400 could acquire corroborating location data using facilities provided by the Communications Manager 2500 involving steps requiring a user to take a specific action. For example, if the Confidence Manager 2400 has reason to believe that a first user whose location is to be verified may be within the visual range of a second user, the Confidence Manager 2400 could send a message to a mobile device associated with the second user asking the second user if he or she can see the first user. The Confidence Manager 2400 could also request the second user to take some other action that would provide data suitable to verify the first user's location, such as taking a picture of the first user or taking a voice recording of or near the first user.

In one embodiment, if a first user or a first user's device supplies corroborating location data for a second user, Confidence Manager 2400 could reward the first user for consistent and reliable responses to such requests or reduced in reputation or reliability rating for failing to respond or for reports that later are proved likely to have been false (or fraud). In some embodiments, verification sources may be monetarily compensated while in others a points, scoring, reputation or reliability rating.

In one embodiment, the Confidence Manager 2400 can be configured to constantly designate, track and update a list of immediately available verification sources, including overseeing any terms associated with use of that source. As users locations change and corroborating sources come and go, the Confidence Manager 2400 can maintains a prioritized list of contact information for verification sources. For example, monetarily compensated verification sources may, for example, be given a higher certification rating that non-monetarily compensated sources because of the additional protections against fraud in commerce created by that transaction.

The Communications Manager 2500 serves as the Verified Presence Tracking Engine's interface to sensor 2700 and communications networks 2800 and supplies location data relating to registered users to the Location Tracking Manager 2300 and the Confidence Manager 2400.

Note that internationally, the collection, storage and dissemination of location data is heavily regulated in some jurisdictions. As such, the physical configuration of a Verified Presence Tracking Service and a Verified presence Tracking Engine as shown in FIG. 1 and FIG. 3 may need to be adapted to regulatory constraints. In some cases, location data may need to be sourced from third party providers authorized by a target jurisdiction. In some cases, sensors from which location data may be acquired, locations from where location data may be acquired, transmission paths for location data, points where location data is stored, and points where location data is cached may need to be fine-tuned to meet regulatory requirements.

Note that a Location Tracking Engine 2000 with limited functionality could also be implemented as a self-contained PIM application or process for only handling a user's own location requests relating only to the user's devices, e.g. synchronization and cross-platform applications or inter-device communication.

Use of Verified Presence Data for Monetization of Commercial Campaigns

The advent of the Internet has enabled advertisers to reach a wide audience with their product offerings. Some of the most popular methods of advertising involve placement of advertisements on third party websites in various forms, such as, for example, block ads, sidebars, banners, popup ads and flash overlays. Such advertisements may simply be display advertisements, can be clickable or can be interactive.

Typically, advertisers pay the publishers of their advertisements fees for ad placement. Such fees can be simple periodic fees, such as a flat monthly fees (e.g. some online directories. Advertising fees are often, however, tied to criteria that involve some kind of user interaction with advertisements. Some of the most popular criteria are cost-per-click (CPC) criteria, where an advertiser pays a fee to a publisher every time a user clicks on an ad, and cost-per-impression (CPM) criteria, where an advertiser pays a fee to a publisher every time a user views an advertisement.

Another paradigm for performance based advertising is cost-per-action (CPA) advertising (sometimes called cost-per-acquisition advertising.) In CPA advertising, advertisers "pay for performance", that is to say, for a specific action or set of actions taken by a user. Such actions could take many forms. Examples are actual product sales, generation of sales leads, registrations or subscriptions for a website or a publication, and so forth. Note that payment for a CPA advertising campaign could include payment to the publisher of the advertisement, but could also include payment of some kind to the user performing an action.

A verified presence system, such as that described above can provide certification and insurance of presence data as conditions to any commercial campaign. Monetization conditions could specify a list of locations, contexts, activities, and time frames with tolerances. Verification policies could attach any level of reliability to presence data within monetization conditions, allowing CPA campaign creators to set their own thresholds for what constitutes reliable data, such that for some contexts and requests, self-certified presence data is sufficient, but in other cases, real-time live human certification may be required.

In one embodiment, commercial campaigns based on verified presence could be defined and maintained by advertisers using the services of a commercial campaign service provider that has access to a verified presence system. The commercial campaign service provider may actually operate and administer a verified presence system, or may alternatively, interface with a verified presence system, for example, using location verification requests.

In one embodiment, the commercial campaign service provider maintains a database of commercial campaigns defined by one or more advertisers. In one embodiment, each commercial campaign comprises an identification of an advertiser, an identification of an advertisement, one or more trigger conditions, one or more monetization conditions, one or more verification policies, and one or more monetization actions.

The identification of an advertiser could be any token or set of tokens that can uniquely identify an advertiser. The commercial campaign service provider could maintain a database of advertisers registered with the service and the identification of an advertiser could refer to one or more entries on such a database. Alternatively, the identification of an advertiser could reflect a user or advertiser identification on another system known to the commercial campaign service, such as a customer ID or account ID on a commercial banking system.

The identification of an advertisement could be any token or set of tokens that can uniquely identify an advertisement. The commercial campaign service provider could maintain a database of advertisements registered with the service and the identification of an advertisement could refer to one or more entries on such a database. Alternatively, the identification of an advertiser could reflect an identification of an advertisement on another system known to the commercial campaign service, such as a website or email server.

Advertisements supported by the service could take any form that could be tracked for users to which the advertisements are targeted. For example, the service could track advertisements displayed on webpages where there is some means provided to identify users who view or take some user interface action (e.g. clicking) related to the advertisements. The user could be identified using any technique known in the art, such as through a browser cookie comprising an identification of the user or a device ID which is known to be associated with the user. Alternatively, a web based campaign could require a user to explicitly register for a promotion.

Advertisements supported by the service could also include directed advertisements, such as emails and directed mailings, where the campaign is tracked for every user that receives the directed advertisement. Such directed campaigns could additionally require a user register or otherwise respond to the directed advertisement, e.g. replying to an email Advertisements supported by the service could also include advertisements associated with a public display where users viewing the advertisements can be identified. Such users could be identified by requiring users to fill out a promotion registration or entry form at the site or by sending an email or a text message to a specific address or phone number. Such users could be identified through their participation in some event or activity. For example, a list of users who purchased tickets for an event may be known to the event promoter and may be presumed to have likely viewed a billboard outside a venue hosting an event.

Advertisements supported by the service could also include advertisements which do not refer to specific copy. For example, a brand campaign which could include a large number of activities and promotions directed to building a positive brand image could be considered a single advertisement for the purposes of this disclosure. Users to be tracked for such campaigns could be identified using any of the methods discussed above, such as through explicit registration, through interaction with advertiser websites or participation in branding promotional events.

The trigger conditions relate to the occurrence of at least one trigger event. Trigger conditions can comprise any events or actions that cause a commercial campaign service to check if monetization conditions and verification policies have been satisfied for a specific user or group of users. Trigger conditions could comprise any action performed by the user that is capable of electronic detection, for example, without limitation, a user interface action performed by the user on a website, the user's presence at a location or series of locations over time, the co-location of the user with one or more persons, the purchase of one or more items or the user's attendance at an event.

Trigger conditions could comprise users explicitly registering for a promotion though, for example, a registration form on a website, dialing a cell phone promotion code, or sending a text message to a specific address. Trigger conditions could comprise users expressly claiming an incentive, for example, through a website or by mail. Trigger conditions could comprise the receipt by a user of a targeted advertisement, such as an email or the redemption of such an advertisement. Trigger conditions could specify a passage of a time interval after a user action, such as, for example, 24 hours after a user clicks on a webpage ad. Trigger conditions could be conditions that do not specifically relate to a user or a user action, such as, for example, a passage of a time interval. Alternatively, or additionally, a campaign may not explicitly contain a trigger condition, and the system uses a default trigger condition, such as, for example, the campaign may check campaigns associated with one or more users every hour.

Monetization conditions could include any kind of parameters analogous to spatial, temporal or social parameters supported in location verification requests. Parameters related to monetization conditions could include one or more spatial parameters that comprise an identification of a location or list of locations. For example, assume a user clicks on an advertisement inviting consumers to test drive an automobile at a car dealership. A corresponding location request could include spatial parameters including the car dealership's location, and could additionally include a pattern of locations that corresponds to a route the dealership uses for consumers to test drive automobiles.

Parameters related to monetization conditions could include one or more temporal parameters that specify a time or time range or a list of times or time ranges. For example, in the case of a location request to verify that a user test drove an automobile, temporal parameters could further specify that monetization conditions are only met if the user visits the car dealership's location within 24 hours of clicking on an advertisement, and furthermore, that the user travels the route the dealership uses for consumers to test drive automobiles within the same time frame.

Alternatively, a temporal parameter could specify a historical date and time, a range of historical dates and times or a list of such dates and times. For example, a user if a user claims a commercial incentive for having test driven an automobile a week ago, the location verification request could refer to that date.

Parameters related to monetization conditions could include at least one additional user where the purpose of the request is to verify that the target and the additional users are or were co-located. Such a parameter could additionally include a specific location and/or time or a list of locations and/or times. For example, a user may have registered for a promotion where the user receives a $10 coupon if the user visits a specific restaurant with at least two persons within the user's social network within the next month.

Commercial campaigns could additionally include parameters to implement verification policies. Parameters related to verification policies could include one or more parameters explicitly indicating the granularity required for the request. For example, in the case of the example discussed above relating to a promotion to encourage consumers to test drive an automobile, location data relating to the car dealership can be required at a building level and location data relating to the test drive route could be required at a less fine grained level of granularity, such as within 1,000 feet.

Parameters related to verification policies could include one or more parameters explicitly indicating the reliability of data required for the request. For example, in the case of the example discussed above relating to a promotion to encourage consumers to test drive an automobile, location data relating to the car dealership could be required at a level of reliability that requires another person, such as a car salesman, to verify a user was at the dealership, whereas the reliability of location data relating to the test drive route could be lower, such that, for example, user cell phone location data could be accepted regardless of the reliability of the user, the sensor or the context.

As in the examples above, commercial campaigns can be defined heuristically, which is to say, solely by a set of rules explicitly requiring specific locations, times, and the presence of other users. Alternatively monetization conditions could be defined empirically using pattern matching techniques. In one embodiment, an advertiser could identify one or more users who performed specific actions in the past. Such specific actions could include actions that, if performed prospectively, would satisfy the monetization conditions of a commercial campaign. For example, a car dealer may have a list of consumers who actually test drove an automobile in the past, or a restaurant may have a list of consumers who visited the restaurant with a group of friends in the past.

Location data could then be retrieved for such consumers for the time frame in which the actions occurred. In one embodiment, such location data could be retrieved from a verified presence system at a desired level of granularity and reliability. Such data could additionally include co-location data for persons within the consumer's social graph. The resulting spatial, temporal and social (co-location) data could then be used to train a classifier, such as, for example, a SVM that recognizes a specific spatio-temporal pattern within the data. The data could additionally be filtered or manipulated, if necessary, before using it to train a classifier.

The classifier can then be used as a parameter in a location verification request for verifying the satisfaction of a monetization condition. In such case, the monetization condition is only satisfied if the pattern recognized by the classifier is identified in user location data. In one embodiment, such a location verification request only includes a classifier, and all location data relating to a user is matched using the classifier.

In one embodiment, a location verification request containing a classifier can additionally include any combination of spatial, temporal and social (co-location) parameters, as well as any combination of reliability and granularity parameters as described above. Such parameters could be used to define matching conditions that must be satisfied in addition to matching the classifier. Such parameters could also be used to define filter conditions that limit the data that is passed to the classifier (e.g. only use data from the last 24 hours to match to the classifier).

Monetization actions associated with a commercial campaign specify who is compensated when all monetization conditions have been met and verified. If an advertiser is paying a publisher or other service provider (such as a commercial campaign service provider) CPA fees, the advertiser can be charged according to the fee agreements between the service provider and the advertiser. If an advertiser is offering incentives to consumers or other end users to participate in a campaign, the incentives can be awarded to the end users (e.g. money, coupons, rebates, frequent shopper points, etc.) If a third party participates in verifying data relating to a commercial campaign, the third party could be compensated in some manner (e.g. money, coupons, rebates, frequent shopper points, etc.).

In some cases a commercial campaign service provider could allow advertisers to bid for placement of advertisements relating to commercial campaigns. Generally speaking, space on popular advertising spaces is limited. For example, the homepage of a website can only realistically host a relatively small number of advertisements without destroying the appeal of the website, and often, only one in the homepage's banner. In one embodiment, a commercial campaign service could provide a user interface that could allow advertisers to define commercial campaigns, view various locations which are available for ad placement and place bids to place their advertisements on selected locations.

Bidding for placement of CPA type campaigns, however, could be somewhat problematical. There is always the possibility that any given campaign may yield no qualifying actions whatsoever (e.g. no one wants to test drive used Yugos or drink chocolate and onion milkshakes). There are at least two potential solutions. First, a bid could simply represent an offer to an ad space owner. The ad space owner could evaluate offers individually and accept or reject bids or make counter offers. For example, a car dealer might offer $1.00 for every person who test drives a new Jaguar at the dealership within 24 hours of clicking on a website banner advertisement, and a website owner might counter with an offer of $2.00 for every person who test drives a new Jaguar at the dealership within 48 hours of viewing a website banner advertisement.

Second, a bid could include additional fees that are more certain. Perhaps the simplest bid could simply be a flat, periodic fee, such as a daily, weekly, monthly or annual placement fee with no additional fees for user actions that satisfy campaign criteria. Alternatively, a bid could include a minimum periodic fee with additional fees for actions that satisfy campaign criteria. In yet another alternative, bids could include CPC or CPM fees in addition to CPA fees. Bids including periodic fees, minimum fees and CPC or CPM fees could be evaluated by an automated bidding process, similar to currently implemented by search engines such as Yahoo! and Google for keyword bidding, or could be evaluated manually by ad space owners.

Figure 4:
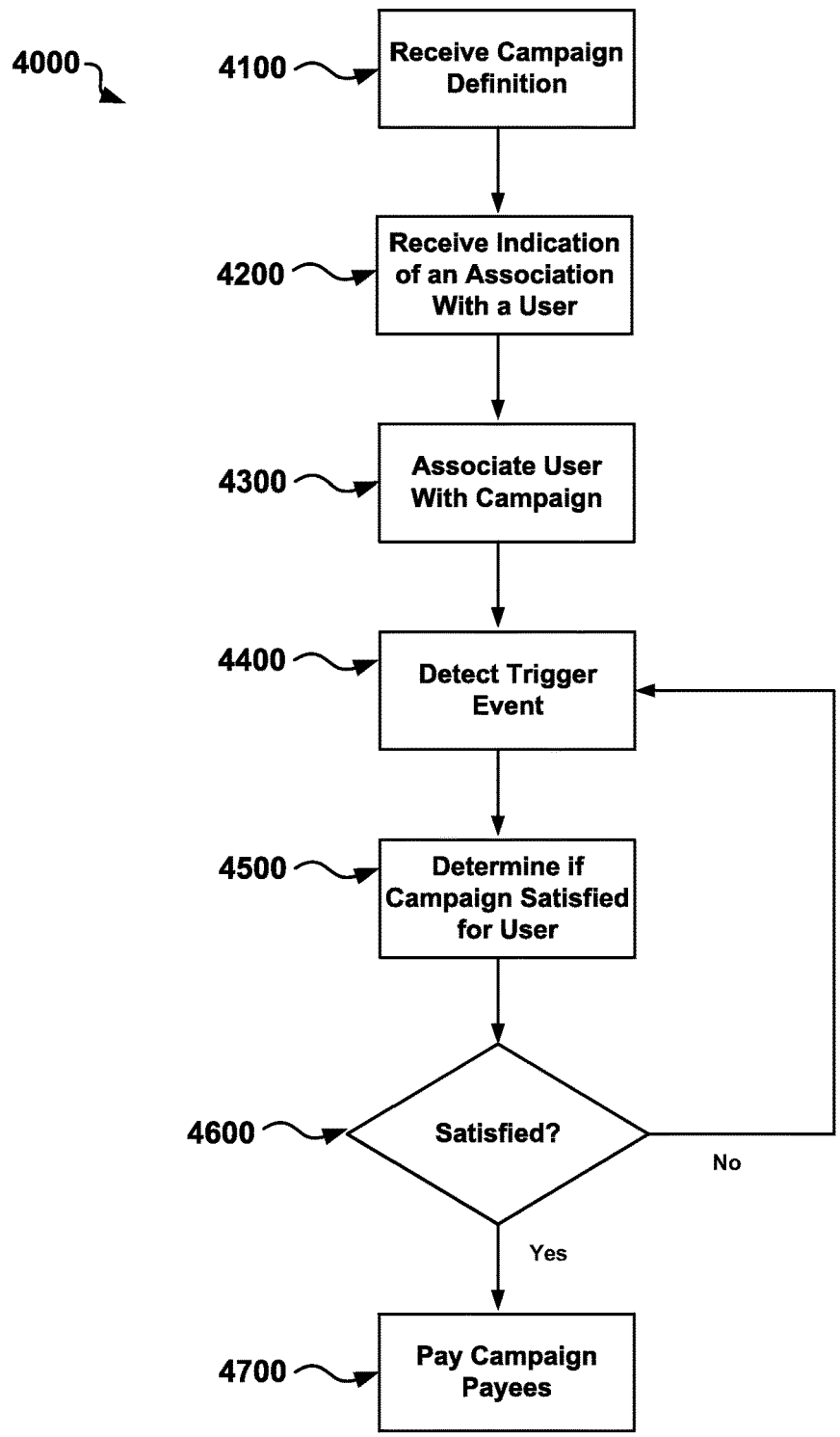
FIG. 4 illustrates one embodiment of a process 4000 for verified monetization of commercial campaigns using at least one embodiment of the system disclosed herein.

FIG. 4 illustrates one embodiment of a process 4000 for verified monetization of commercial campaigns using at least one embodiment of the system disclosed herein.

A definition of a commercial campaign is received 4100, over a network, such as the Internet, from an advertiser. The request may have been transmitted from an advertiser using any conventional methodology for transmitting information over a network, such as data entered through a web form, transmitted using a custom API, an email, or an instant message. In one embodiment, the campaign definition comprises an identification of an advertiser, an identification of an advertisement, at least one trigger condition, at least one monetization condition, at least one verification policy, and at least one monetization action.

As discussed in greater detail above, the trigger conditions relate to the occurrence of at least one trigger event. Such trigger event can comprise any events or actions that cause a commercial campaign service to check if monetization conditions and verification policies have been satisfied for a specific user or group of users. Monetization conditions can include conditions that relate to location data relating to one or more persons. For example, such conditions could include any kind of parameters analogous to spatial, temporal or social parameters supported in location verification requests. Verification policies can include policies that relate to the reliability of the location data specified in monetization conditions. Verification policies can additionally include policies explicitly indicating the granularity of location data location data specified in monetization conditions. Monetization actions associated with a commercial campaign specify who is compensated when all monetization conditions have been met and verified.

As in the examples above, commercial campaigns could be defined heuristically, which is to say, solely by a set of rules explicitly requiring specific locations, times, and the presence of other users. Alternatively monetization conditions could be defined empirically using pattern matching techniques, including training and using classifiers (e.g. SVMs).

In one embodiment, commercial campaigns are stored on a database or other computer-readable media. In one embodiment, advertisers can bid for placement of their advertisements included in the commercial campaigns on specific ad spaces such as websites, emails, mailings and public displays of any type.

When an indication of an association between a user and the advertisement referenced in the commercial campaign is received 4200 over the network, the user is associated with the commercial campaign 4300 using at least one computing device. In one embodiment, if the user is already associated with the commercial campaign, the indication of association between the user and the campaign is ignored.

The indication of an association between a user and a commercial campaign could be any type of data including sufficient information to indicate a user is to be associated with a specific commercial campaign. In one embodiment, such data comprises at least an identification of a user and sufficient information to identify one or more campaigns. Information sufficient identify one or more campaigns could be, for example, the identification of the advertiser and the advertisement associated with the campaign, or could be a unique campaign ID assigned to a campaign when it is added to a commercial campaign database.

The indication of an association between a user and a commercial campaign could be generated in response to any type of user action. Such user actions could include any type of user interface action taken by a user on a webpage, such as viewing an ad or clicking on an advertisement associated with a commercial campaign or explicitly registering for a promotion through the webpage. In such cases, the user could be identified using any technique known in the art, such as through a browser cookie comprising an identification of the user or a device ID which is known to be associated with the user. Such user actions could also include responding to directed advertisements, whether electronically or not (e.g. mail-in postcards), such as replying to emails and directed mailings.

Such user actions could include more passive actions, such as viewing a publically displayed advertisement. Such users could be identified by requiring users to fill out a promotion registration or entry form at the site or by sending an email or a text message to a specific address or phone number. Such users could be identified through their participation in some event or activity. Users viewing a public display could even be identified biometrically.

The indication of an association between a user and a commercial campaign could be generated in response to an advertiser action directed to one or more users. For example, every user to which an advertiser sends an advertisement may be automatically associated with a commercial campaign relating to the advertisement.

In one embodiment users are associated with a campaign by updating a database comprising entries for each association, where a given entry can comprise an identification of the user and information sufficient to identify a specific campaign. Information sufficient identify one or more campaigns could be, for example, the identification of the advertiser and the advertisement associated with the campaign, or could be a unique campaign ID assigned to a campaign when it is added to a commercial campaign database.

A database entry for an association of a user with a commercial campaign could include additional information. For example, entries could include information that is useful in determining the occurrence of trigger conditions. For example, if a campaign trigger condition occurs 24 hours after a user clicks on an advertisement, a database entry for an association of a user with a commercial campaign could include a timestamp indicating when the user viewed the advertisement.

When the occurrence of the campaign's trigger event is detected 4400, it is determined, using a computing device, if the monetization conditions and the verification policies of the campaign have been satisfied 4500 with respect to the user. In one embodiment, when monetization conditions are evaluated, the person referenced in monetization conditions is taken to be the user associated with the trigger condition. Depending on the definition of a monetization conditions, the condition may refer to two or more persons. In such cases, at least one person referenced in the monetization condition is taken to be the user associated with the trigger condition and the remaining persons in the condition are taken to be other users (e.g. from the users social circle).

In one embodiment, in step 4500, the process interfaces with a verified presence process to determine if campaign conditions have been satisfied. In one embodiment, a request to verify one or more target's location could be formulated using the monetization conditions and verification policies included in the campaign and the request could be submitted to a verified presence process, such as, for example, the process shown in FIG. 2 above. The verified presence process could be remote or local to the verified monetization of commercial campaigns process 4000.

Alternatively, step 4500 could represent a local verified presence process substantially similar to the process shown in FIG. 2 where instead of receiving a verified location request, the process directly uses the monetization conditions and verification policies in the commercial campaign to execute steps 1200-1700 of FIG. 2.

If the campaign's monetization conditions and verification policies have been satisfied 4600, the payees are paid 4700 according to the campaign's monetization actions. Such payees could be, without limitation, a publisher or other service provider. Such payees could be consumers or other end users participating in a campaign to receive an incentive. Such payees could be a second person or entity that facilitated the redemption of a targeted advertisement by the user. Such payees could be owners of a corroborating data sources used to determine verification policies have been satisfied.

Figure 5:
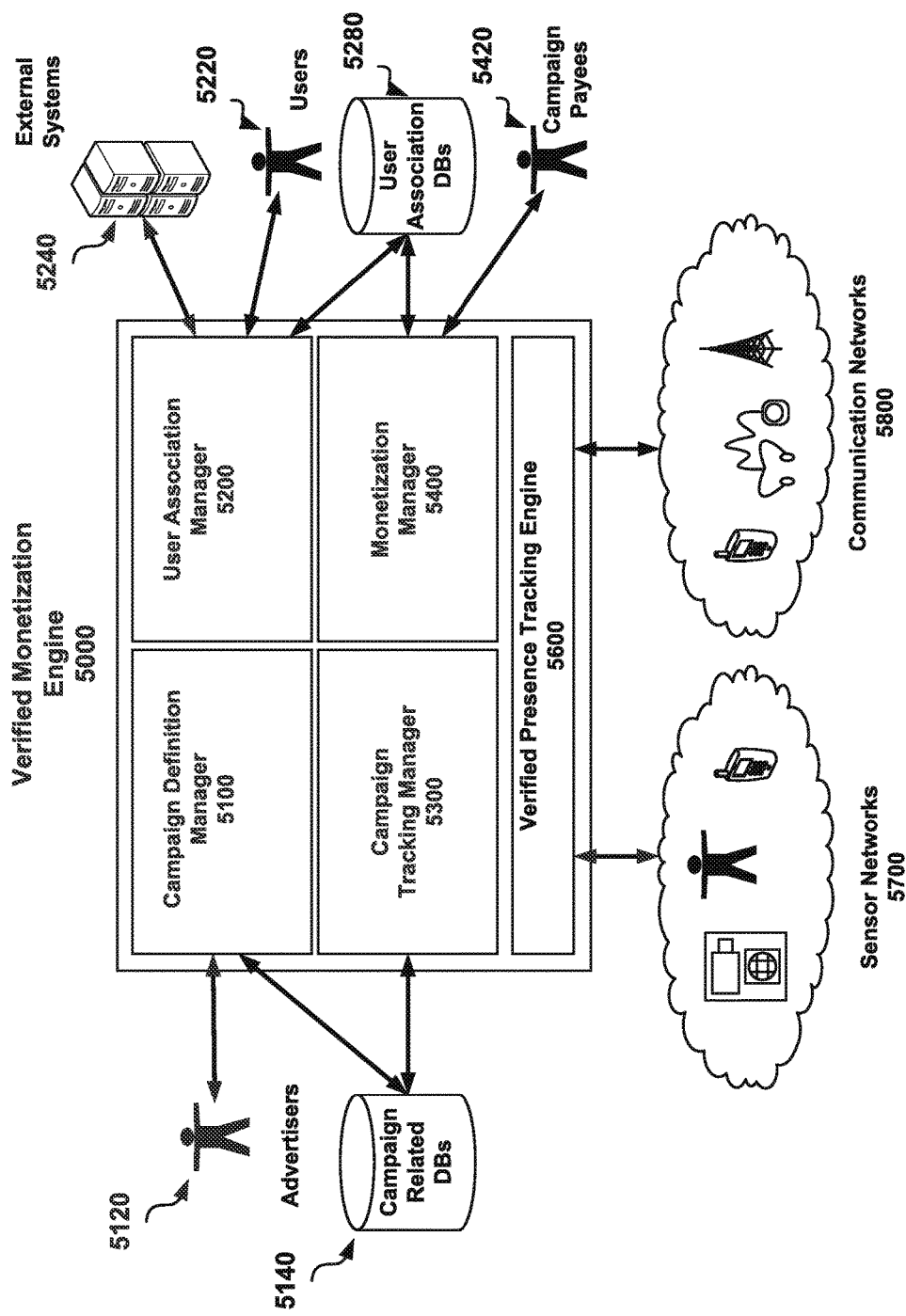
FIG. 5 illustrates one embodiment of a verified monetization engine capable of supporting at least one embodiment of the process described in FIG. 4.

FIG. 5 illustrates one embodiment of a verified monetization engine 5000 capable of supporting at least one embodiment of the process described in FIG. 4 above.

In one embodiment, the verified monetization engine 5000 comprises a Campaign Definition Manager 5100, a User Association Manager 5200, a Campaign Tracking Manager 5300 and a Monetization Manager 5400. In one embodiment, the verified monetization engine 5000 could incorporate the functionality of a verified presence tracking engine 5600, or alternatively, could be interface with a verified presence tracking engine or could itself be a component of a verified presence tracking engine.

In one embodiment, each of the managers comprises one or more processors programmed to execute software code retrieved from a computer readable storage medium storing software for functions as described below. In one embodiment, each of the modules could be hosted on one or more servers hosted by a verified presence tracking service 100 or a commercial campaign service 150 shown in FIG. 1. Such an embodiment is purely exemplary, and all of the managers shown could be implemented in any combination on any number servers, as will be readily apparent to those skilled in the art.

The Campaign Definition Manager 5100 is configured to receive definitions of commercial campaigns, over a network, such as the Internet, from advertisers 5120. The request can be transmitted from advertisers using any conventional methodology for transmitting information over a network, such as data entered through a web form, transmitted using a custom API, an email, or an instant message. In one embodiment, the campaign definitions each comprise an identification of an advertiser, an identification of an advertisement, at least one trigger condition, at least one monetization condition, at least one verification policy, and at least one monetization action.

In one embodiment, commercial campaigns can be stored on one or more campaign related databases 5140 or other computer-readable media. In one embodiment, the Campaign Definition Manager 5140 can enable advertisers to bid for placement of advertisements included in the commercial campaigns on specific ad spaces such as websites, emails, mailings and public displays of any type.

The User Association Manager 5200 is configured to receive, over the network, indications of associations between user and advertisements referenced in the commercial campaigns and to associate such users with commercial campaigns. The indication of an association between a user and a commercial campaign could be any type of data including sufficient information to indicate a user is to be associated with a specific commercial campaign. In one embodiment, such data comprises at least an identification of a user and sufficient information to identify one or more campaigns.

In one embodiment, User Association Manager 5200 associates users with campaigns by updating a database 5280 comprising entries for each association, where a given entry can comprise an identification of the user and information sufficient to identify a specific campaign, and could include additional information.

The Campaign Tracking Manager 5300 is configured to detect the occurrence of the campaign's trigger events and determine if the monetization conditions and the verification policies campaigns have been satisfied 4500. In one embodiment, when monetization conditions are evaluated, persons referenced in monetization conditions are taken to be the user associated with the trigger condition. Depending on the definition of a monetization conditions, conditions may refer to two or more persons.

In one embodiment, Campaign Tracking Manager 5300 interfaces with a verified presence tracking engine 5600 to determine if campaign conditions have been satisfied. In one embodiment, a request to verify one or more target's location could be formulated using the monetization conditions and verification policies included in the campaign and the request could be submitted to a verified presence process, such as, for example, the process shown in FIG. 2 above. The verified presence tracking engine 5600 could be remote or local to the verified monetization engine 5000.

The Monetization Manager 5400 is configured to, monetization conditions and verification policies have been satisfied with respect to users associated with commercial campaigns, pay payees 5420 of such commercial campaigns. Such payees could be, without limitation, a publisher or other service provider or consumers or other end users to paid participate in a campaigns.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

We claim:

1. A method comprising:
    assigning, by the computing device, a user to an archetype by:
        initially assigning a reliability value of the user to a default value, accumulating network interactions of the user over a time period, correlating the network interactions with a sensor measurement, increasing the reliability value after the time period expires when the network interactions are correlated with the sensor measurement, decreasing the reliability value after the time period expires when the network interactions are not correlated with the sensor measurement, and assigning the user to an archetype based on the reliability value;

assigning, by the computing device, a sensor reliability value to a sensor by:

initially assigning a sensor reliability value to a second default value, accumulating location measurements of the sensor, and adjusting the sensor reliability value based on a correlation between the location measurements of the sensor and other location measurements;

detecting, by the computing device, the occurrence of a trigger event, the trigger event comprising an action performed by the user that is capable of electronic detection and a level of granularity;

receiving, by the computing device, current location data associated with the user and the sensor based on a current measurement of the sensor or the user;

calculating, by the computing device, a current reliability of the current location data based on the archetype and the sensor reliability value;

determining, by the computing device, that the level of granularity has been satisfied based in part on the location data and based in part on the reliability of the location data; and transmitting, by the computing device, the current location data to a requesting device if the reliability of the current location satisfies the level of granularity in the request for the location.

2. The method of claim 1, the action performed by the user that is capable of electronic detection comprising a user interface action performed by the user on a website.

3. The method of claim 1, the action performed by the user that is capable of electronic detection comprising the user's presence at a location.

4. The method of claim 1, the action performed by the user that is capable of electronic detection comprising the co-location of the user with at least a second person.

5. The method of claim 1, the action performed by the user that is capable of electronic detection comprising a purchase of at least one item.

6. The method of claim 1, the action performed by the user that is capable of electronic detection comprising the user's attendance at an event.

7. The method of claim 1, the trigger event comprising a passage of a time interval after a user interface action performed by the user on a website.

8. The method of claim 1, the trigger event comprising receipt by the user of a targeted advertisement.

9. The method of claim 1, the trigger event comprising redemption by the user of a targeted advertisement.

10. The method of claim 1, the level of granularity relating to the reliability of location data relating to the at least two persons, a purpose of the level of granularity comprising verifying that the co-location of the at least two persons has at least a threshold level of reliability.

11. The method of claim 1, the determining step comprising:

formulating, by the computing device, a location verification request;

submitting, by the computing device over the network, the location verification request to a verified presence system;

receiving, by the computing device over the network, a response to the location verification request.

12. A system comprising:

a verified monetization engine executed by the processor programmed to execute software code retrieved from the non-transitory computer readable storage medium storing software for assigning a user to an archetype by initially assigning a reliability value of the user to a default value, accumulating network interactions of the user over a time period, correlating the network interactions with a sensor measurement, increasing the reliability value after the time period expires when the network interactions are correlated with the sensor measurement, decreasing the reliability value after the time period expires when the network interactions are not correlated with the sensor measurement, and assigning the user to an archetype based on the reliability value, and assigning a sensor reliability value to a sensor by initially assigning a sensor reliability value to a second default value, accumulating location measurements of the sensor, and adjusting the sensor reliability value based on a correlation between the location measurements of the sensor and other location measurements;

a campaign tracking manager executed by the processor programmed to execute software code retrieved from the non-transitory computer readable storage medium storing software for detecting the occurrence of a trigger event, the trigger event comprising an action performed by the user that is capable of electronic detection and a level of granularity;

receiving current location data associated with the user and the sensor based on a current measurement of the sensor or the user, calculating a current reliability of the current location data based on the archetype and the sensor reliability value, determining that the level of granularity has been satisfied, based in part on the location data and based in part on the reliability of the location data; and a monetization manager executed by the processor programmed to execute software code retrieved from the non-transitory computer readable storage medium storing software for transmitting the current location data to a requesting device if the reliability of the current location satisfies the level of granularity in the request for the location.

13. The system of claim 12, the level of granularity relating to the reliability of location data relating to the two persons, a purpose of the level of granularity comprising verifying that the co-location of the two persons has a threshold level of reliability.

14. The system of claim 12, the campaign tracking manager further programmed to execute software code retrieved from the non-transitory computer readable storage medium storing software for formulating location verification requests, submitting, over the network, the location verification requests to a verified presence system, and receiving, over the network, responses to the location verification requests.

15. A non-transitory computer-readable storage medium having computer-executable instructions for execution by a processor of a computing device, the instructions for a method comprising the steps of:
- assigning, by the computing a device, a user to an archetype by:
  - initially assigning a reliability value of the user to a default value,
  - accumulating network interactions of the user over a time period,
  - correlating the network interactions with a sensor measurement,
  - increasing the reliability value after the time period expires when the network interactions are correlated with the sensor measurement,
  - decreasing the reliability value after the time period expires when the network interactions are not correlated with the sensor measurement, and
  - assigning the user to an archetype based on the reliability value;
- assigning, by the computing device, a sensor reliability value to a sensor by:
  - initially assigning a sensor reliability value to a second default value,
  - accumulating location measurements of the sensor, and
  - adjusting the sensor reliability value based on a correlation between the location measurements of the sensor and other location measurements;
- detecting, by the computing device, the occurrence of a trigger event, the trigger event comprising an action performed by the user that is capable of electronic detection and a level of granularity;
- receiving, by the computing device, current location data associated with the user and the sensor based on a current measurement of the sensor or the user;
- calculating, by the computing device, a current reliability of the current location data based the archetype and the sensor reliability value;
- determining, by the computing device, that the level of granularity has been satisfied based in part on the location data and based in part on the reliability of the location data; and
- transmitting, by the computing device, the current location data to a requesting device if the reliability of the current location satisfies the level of granularity in the request for the location.

16. The non-transitory computer-readable storage medium of claim 15, in the level of granularity relating to the reliability of location data relating to the two persons, the purpose of the level of granularity comprising verifying that the co-location of the two persons has at least a threshold level of reliability.

17. The non-transitory computer-readable storage medium of claim 15, the determining step comprising:
- formulating, by the computing device, a location verification request;
- submitting, by the computing device over the network, the location verification request to a verified presence system;
- receiving, by the computing device over the network, a response to the location verification request.

* * * * *